(12) United States Patent
Masuda et al.

(10) Patent No.: US 6,323,340 B1
(45) Date of Patent: *Nov. 27, 2001

(54) PHTHALOCYANINE COMPOUND, METHOD FOR PRODUCTION THEREOF, AND NEAR INFRARED ABSORPTION DYE USING THE COMPOUND

(75) Inventors: Kiyoshi Masuda; Masunori Kitao, both of Ushiku; Chie Tateyama, Tsukuba, all of (JP)

(73) Assignee: Nippon Shobukai Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/624,637

(22) Filed: Jul. 24, 2000

(30) Foreign Application Priority Data

Jul. 30, 1999 (JP) .................................. 11-217736

(51) Int. Cl.⁷ ......................... C09B 47/04; C09B 62/00; C09B 67/00
(52) U.S. Cl. .................... 540/128; 540/130; 540/136; 540/139; 540/140; 540/143
(58) Field of Search .................. 540/128, 130, 540/136, 139, 140, 143

(56) References Cited

U.S. PATENT DOCUMENTS

| | | | |
|---|---|---|---|
| 4,606,859 | 8/1986 | Duggan et al. | 540/122 |
| 5,516,899 | 5/1996 | Campbell et al. | 540/123 |
| 5,629,417 | 5/1997 | Campbell et al. | 540/122 |
| 5,804,102 | 9/1998 | Oi et al. | 252/587 |
| 6,069,244 | 5/2000 | Masuda et al. | 540/139 |

FOREIGN PATENT DOCUMENTS

| | | | |
|---|---|---|---|
| 0 934 985-A2 | * 8/1999 | (EP) . | |
| 0 795 565 A1 | 9/1997 | (EP) | C08F/2/44 |
| 0 523 959 A2 | 1/1993 | (EP) | C09B/47/08 |
| 9-316049 | 12/1997 | (JP) | C07C/323/63 |
| 7-70129 | 3/1995 | (JP) | C07D/487/22 |
| 64-45474 | 2/1989 | (JP) | C09B/47/10 |
| 11-293135 | 10/1999 | (JP) | C09B/47/10 |
| 6-25548 | 2/1994 | (JP) | C09B/47/22 |
| 6-192584 | 7/1994 | (JP) | C09B/47/22 |
| 10-182995 | 7/1998 | (JP) | C09B/47/22 |
| 2000-26748 | 1/2000 | (JP) | C09B/47/22 |
| 9-239134 | 9/1997 | (JP) | G02B/5/22 |
| WO 98/08895 | 3/1998 | (WO) | C08K/5/00 |

* cited by examiner

*Primary Examiner*—John M. Ford
*Assistant Examiner*—Kahsay Habte
(74) *Attorney, Agent, or Firm*—Fish & Richardson P.C.

(57) ABSTRACT

A phthalocyanine compound is provided which exhibits particularly high transmittance to a visible ray, offers a highly efficient cut of a near infrared ray, excels in the ability to effect selective absorption in a near infrared region, excels in the solubility in a solvent, excels in the compatibility with a resin, and excels in heat resistance, light resistance, and weatherability, a method for the production thereof, a near infrared absorbable dye using the same, and a heat ray shielding material, a plasma display grade filter and a near infrared absorbable material formed thereof. The phthalocyanine compound of this invention is represented by the following formula (1):

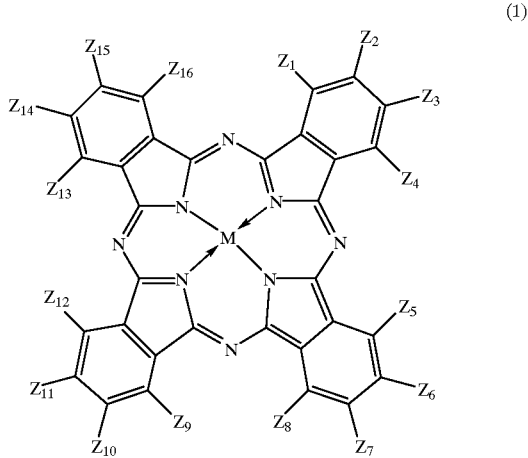

(1)

wherein $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a halogen atom, provided that at least one of them stands for $NHR^3$ and at least four of them stand for $OR^2$; a plurality of $R^1$, $R^2$, and $R^3$, independently to each other, stand for a substituted or non-substituted phenyl group, a substituted or non-substituted aralkyl group, or a substituted or non-substituted alkyl group of 1 to 20 carbon atoms; and M stands for a nonmetal, a metal, a metal oxide, or a metal halide.

14 Claims, 1 Drawing Sheet

PHTHALOCYANINE COMPOUND, METHOD FOR PRODUCTION THEREOF, AND NEAR INFRARED ABSORPTION DYE USING THE COMPOUND

BACKGROUND OF THE INVENTION

1. Field of the Invention

This invention relates to a novel phthalocyanine compound, a method for the production thereof, a near infrared absorption dye using the compound, and a heat ray shielding material, a plasma display grade filter, and a near infrared absorbable material formed thereof. More particularly, this invention relates to a phthalocyanine compound which exhibits high transmittance, particularly to a visible light ray, enjoys a high efficiency in cutting a near infrared ray, excels in the ability to absorb a near infrared ray, excels in the solubility in a solvent, manifests fine compatibility with resin, and excels in such special qualities as heat resistance, light resistance, and weatherability, a method for the production thereof, a near infrared absorbable dye using the same, and a heat ray shielding material, a plasma display grade filter and a near infrared absorbable material formed thereof.

The phthalocyanine compound of this invention manifests outstanding effects when used as a heat ray shielding material, a heat ray absorbing laminated glass for an automobile, a heat ray shielding film, or a heat ray shielding resin glass which has for translucency or transparency and is used for shielding a heat ray, a plasma display grade filter having high visible light transmission and high cutting efficiency of a near infrared ray, and a near infrared absorbent for a noncontact fixing toner such as flash fixture, as well as used as a near infrared absorbent for heat-retaining and heat-accumulating fibers, an infrared absorbent for fibers having a camouflaging properties to counter reconnaissance with an infrared ray, a near infrared absorbable dye for writing or reading a character as in an optical recording medium using a semiconductor laser, a liquid crystal display device, an optical character reader, a near infrared ray sensitizer, a photothermal exchanger for thermosensitive transcription and thermosensitive mimeograph, a near infrared absorption filter, an eye strain relieving agent, or a photoconducting material, and as a photo dye for ulcer therapy which excels in tissue permeability and capable of absorbing light in a long wavelength region, a color Braun tube selective absorption filter, a color toner, an ink jet grade ink, an ink for preventing counterfeit, a bar code ink for preventing counterfeit, a near infrared absorbable ink, a marking agent for positions of photographs and films, a lens and a shielding plate in goggles, a stain for sorting recycling plastic scraps, and a preheating auxiliary used during the formation of PET bottles.

2. Description of the Related Art

In recent years, heat ray shielding materials which are adapted to absorb a near infrared ray have been encouraging introduction of varying uses and the desirability of developing such heat ray shielding materials with improved performance has been finding enthusiastic recognition. The following uses (1) to (3) may be cited as typical examples.

(1) Such a materials as a methacrylic resin and a polycarbonate resin have been found utility in the so-called glazing applications such as windows in buildings and vehicles such as automobiles, ceiling windows, doors, and ceiling domes. These materials have been urged to be so adapted as to prevent their interior temperature from rising while maintaining fully satisfactory admission of the visible light.

(2) In the cultivation of a plant, a greenhouse and a plastic greenhouse have been extensively utilized for the purpose of improving the harvests of crops in quality or changing the harvest period. The desirability of developing a heat ray shielding film which manifests an expected effect without substantially hindering the transmission of a visible light necessary for the growth of the plant has been finding recognition.

(3) A near infrared ray has been frequently used for driving or stopping such an electrical product as a magnetic tape. Though the near infrared serving this purpose requires to be shielded from an external near infrared ray, the demand for utilizing this near infrared ray for such applications has persisted.

Further, a near infrared light emitting from a plasma display has been causing a problem of compelling such a peripheral electronic equipment as a cellular phone and a video deck using a near-infrared radiated remote control to produce a wrong operation. While the desirability of developing a plasma display grade filter capable of manifesting a perfect effect in absorbing a near infrared ray has been finding recognition, no proposal has yet been advanced regarding a method for overcoming the problem under discussion by using a plasma display grade filter having such a phthalocyanine compound as effectively forms a near infrared absorbent incorporated therein.

This invention has been accomplished in the light of the above-mentioned situations which the prior art has had in the applications in various fields which allow utility of phthalocyanine compounds.

Specifically, this invention has been attained for the purpose of solving the technical problems to be encountered in the various fields (applications) which allow utility of phthalocyanine compounds. An object of this invention is to provide a phthalocyanine compound which exhibits particularly high transmittance to a visible ray, offers a highly efficient cut of a near infrared ray, excels in the ability to effect selective absorption in a near infrared region, excels in the solubility in a solvent, excels in the compatibility with a resin, and excels in heat resistance, light resistance, and weatherability, a method for the production thereof, a near infrared absorbable dye using the same, and a heat ray shielding material, a plasma display grade filter and a near infrared absorbable material formed thereof.

SUMMARY OF THE INVENTION

The present inventors have made a diligent study with a view to solving the technical problems encountered by the prior art in the applications in various fields of utility allowed for phthalocyanine compounds, to find a novel phthalocyanine compound useful for various applications including a near infrared absorbable dye using the same, and a heat ray shielding material, a plasma display grade filter and a near infrared absorbable material which exhibits particularly high transmittance to the visible ray, offers a highly efficient cut of the near infrared ray, excels in the ability to effect selective absorption in the near infrared region, excels in the solubility in a solvent, excels in the compatibility with resin, and excels in the resistance to heat, light, and weather conditions. They have perfected this invention as a result.

Specifically, the object of the present invention can be accomplished by a phthalocyanine compound represented by the following formula (1):

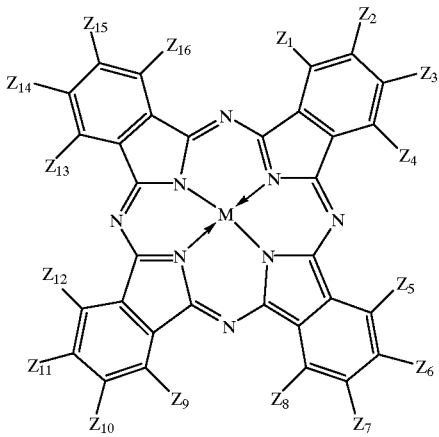

(1)

wherein $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a halogen atom, provided that at least one of them stands for $NHR^3$ and at least four of them stand for $OR^2$; a plurality of $R^1$, $R^2$, and $R^3$, independently to each other, stand for a substituted or non-substituted phenyl group, a substituted or non-substituted aralkyl group, or a substituted or non-substituted alkyl group of 1 to 20 carbon atoms; and M stands for a nonmetal, a metal, a metal oxide, or a metal halide.

The object of the present invention can be also accomplished by a phthalocyanine compound represented by the following formula (1):

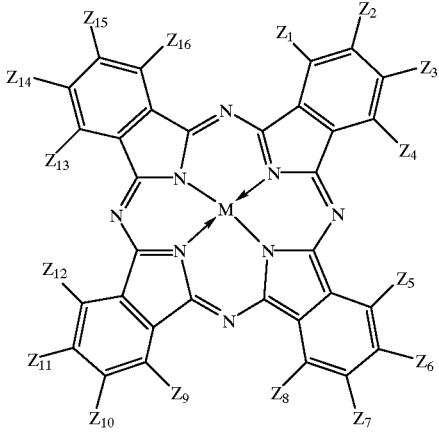

(1)

wherein $Z_2$, $Z_3$, $Z_6$, $Z_7$, $Z_{10}$, $Z_{11}$, $Z_{14}$, and $Z_{15}$ independently stand for $SR^1$, $OR^2$, or a fluorine atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a fluorine atom, provided that at least one of them stands for $NHR^3$ and at least four of them stand for $OR^2$, and at least one of $Z_1$ to $Z_{16}$ is a fluorine atom; a plurality of $R^1$, $R^2$, and $R^3$, independently to each other, stand for a substituted or non-substituted phenyl group, a substituted or non-substituted aralkyl group, or a substituted or non-substituted alkyl group of 1 to 20 carbon atoms; and M stands for a nonmetal, a metal, a metal oxide, or a metal halide.

The object of the present invention can be further accomplished by a method for the production of a phthalocyanine compound of this invention, which method comprises reacting by cyclization a phthalonitrile compound (1) represented by the following formula (2):

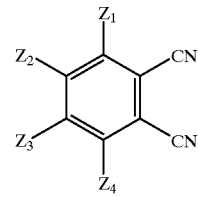

(2)

a phthalonitrile compound (2) represented by the following formula (3):

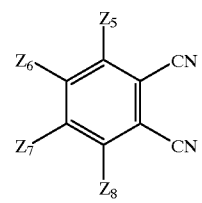

(3)

a phthalonitrile compound (3) represented by the following formula (4):

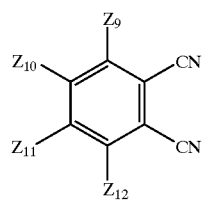

(4)

and a phthalonitrile compound (4) represented by the following formula (5):

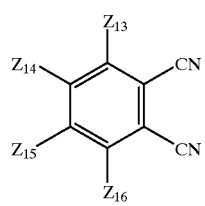

(5)

wherein in the formulae (2) to (5), $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $SR^1$, $OR^2$, or a halogen atom, provided that at least one of them stands for $SR^1$ or a halogen atom and at least four of them stand for $OR^2$; and a plurality of $R^1$ and $R^2$, independently to each other, stand for a substituted or non-substituted phenyl group, a substituted or non-substituted aralkyl group, or a substituted or non-substituted alkyl group of 1 to 20 carbon atoms, with one member selected from the group consisting of metal oxides, metal carbonyls, metal halides and organic acid metals, and thereafter reacting the resultant reaction product with an amine compound of the formula (6): $NH_2R^3$, wherein $R^3$ stands for a substituted or non-substituted phenyl group, a substituted or non-substituted aralkyl group, or a substituted or non-substituted alkyl group of 1 to 20 carbon atoms.

The object of the present invention can be further accomplished by a near infrared absorbable dye formed by using the phthalocyanine compound according to this invention, wherein said dye exhibits a transmittance of not less than 65% to the visible ray in a solution prepared to contain said phthalocyanine compound at a concentration such that a minimum value of the transmittance at 750 to 1,050 nm in the range of 5 to 6% in the measurement of a transmission spectrum.

The object of the present invention can be furthermore accomplished by a heat ray shielding material, a plasma display grade filter, and a near infrared absorbable material, which comprise the phthalocyanine compound and/or the near infrared absorbable dye according to this invention.

The phthalocyanine compound of this invention and the near infrared absorbable dye formed of this compound exhibits high transmittance, particularly to a visible light ray, enjoys a high efficiency in cutting a near infrared ray, excels in the ability to absorb a near infrared ray, excels in the solubility in a solvent, manifests fine compatibility with resin, and excels in such special qualities as heat resistance, light resistance, and weatherability.

The phthalocyanine compound of this invention manifests outstanding effects when used as a heat ray shielding material, a heat ray absorbing laminated glass for an automobile, a heat ray shielding film, or a heat ray shielding resin glass which has for translucency or transparency and is used for shielding a heat ray, a plasma display grade filter having high visible light transmission and high cutting efficiency of a near infrared ray, and a near infrared absorbent for a noncontact fixing toner such as flash fixture, as well as used as a near infrared absorbent for heat-retaining and heat-accumulating fibers, an infrared absorbent for fibers having a camouflaging properties to counter reconnaissance with an infrared ray, a near infrared absorbable dye for writing or reading a character as in an optical recording medium using a semiconductor laser, a liquid crystal display device, an optical character reader, a near infrared ray sensitizer, a photothermal exchanger for thermosensitive transcription and thermosensitive mimeograph, a near infrared absorption filter, an eye strain relieving agent, or a photoconducting material, and as a photo pigment for ulcer therapy which excels in tissue permeability and capable of absorbing light in a long wavelength region, a color Braun tube selective absorption filter, a color toner, an ink jet grade ink, an ink for preventing counterfeit, a bar code ink for preventing counterfeit, a near infrared absorbable ink, a marking agent for positions of photographs and films, a lens and a shielding plate in goggles, a stain for sorting recycling plastic scraps, and a preheating auxiliary used during the formation of PET bottles.

The above and other objects, features and advantages of the present invention will become clear from the following description of the preferred embodiments.

DESCRIPTION OF THE PREFERRED EMBODIMENTS

Figure 1:
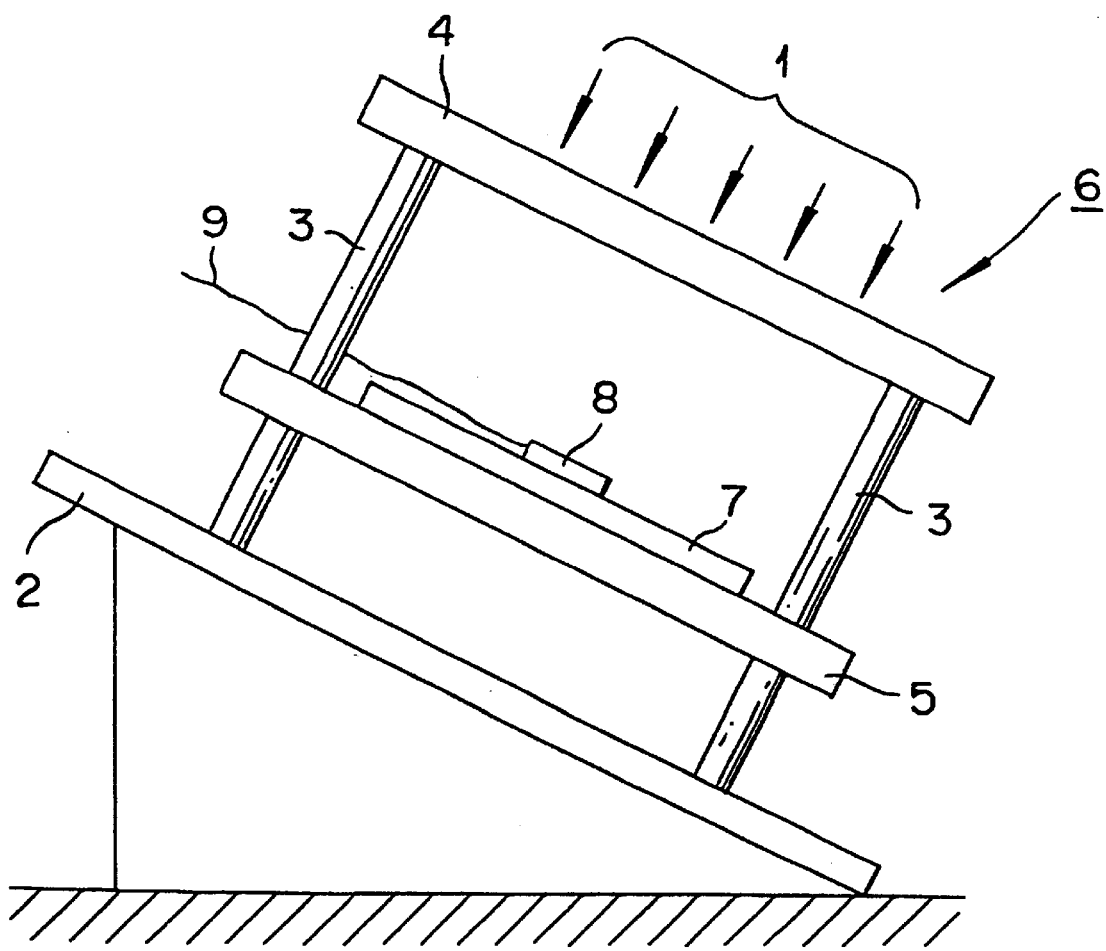
FIG. 1 is a schematic diagram illustrating a temperature measuring device so constructed that the panel used for the measurement in Examples 15 and 16 and Controls 5 to 7 suffers no accumulation of heat therein because it permits passage of a current of air therethrough.

According to the first aspect, the phthalocyanine compound of this invention is represented by the formula (1) below.

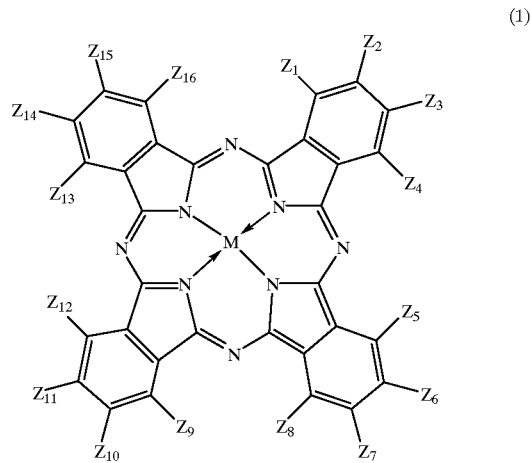

(1)

In this aspect, according to the first embodiment (a), in the formula (1), $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a halogen atom, provided that at least one of them stands for $NHR^3$ and at least four of them stand for $OR^2$; a plurality of $R^1$, $R^2$, and $R^3$, independently to each other, stand for a substituted or non-substituted phenyl group, a substituted or non-substituted aralkyl group, or a substituted or non-substituted alkyl group of 1 to 20 carbon atoms; and M stands for a nonmetal, a metal, a metal oxide, or a metal halide. Further, according to the second embodiment (b), in the formula (1), $Z_2$, $Z_3$, $Z_6$, $Z_7$, $Z_{10}$, $Z_{11}$, $Z_{14}$, and $Z_{15}$ independently stand for $SR^1$, $OR^2$, or a fluorine atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a fluorine atom, provided that at least one of them stands for $NHR^3$ and at least four of them stand for $OR^2$, and at least one of $Z_1$ to $Z_{16}$ is a fluorine atom; a plurality of $R^1$, $R^2$, and $R^3$, independently to each other, for a substituted or non-substituted phenyl group, a substituted or non-substituted aralkyl group, or a substituted or non-substituted alkyl group of 1 to 20 carbon atoms; and M stands for a nonmetal, a metal, a metal oxide, or a metal halide. Now, these embodiments will be described specifically below.

In the above formula (1), the symbol "M", in both the embodiments, stands for a nonmetal, a metal, a metal oxide, or a metal halide. The term "nonmetal" as used herein means atoms other than metal atoms such as, for example, two hydrogen atoms. As typical examples of the metal, iron, magnesium, nickel, cobalt, copper, palladium, zinc, vanadium, titanium, indium, and tin may be cited. As typical examples of the metal oxide, titanyl and vanadyl may be cited. As typical examples of the metal halide, aluminum chloride, indium chloride, germanium chloride, tin(II) chloride, tin(IV) chloride, and silicon chloride may be cited. M is preferably metals, metal oxides, or metal halide. More specifically, copper, zinc, cobalt, nickel, iron, vanadyl, titanyl, chloroindium, and tin(II) chloride are preferably used. More preferably, copper, vanadyl, and zinc are used.

In the formula (1) mentioned above, $Z_2$, $Z_3$, $Z_6$, $Z_7$, $Z_{10}$, $Z_{11}$, $Z_{14}$, and $Z_{15}$ (referred to occasionally as substituents at any of 8 β positions of the phthalocyanine ring) independently stands for $SR^1$, $OR^2$, or a halogen atom, provided that at least one of them stands for $SR^1$ or $OR^2$ in the embodiment (a); and independently stands for $SR^1$, $OR^2$, or a fluorine atom, provided that at least one of them stands for $SR^1$ or $OR^2$ in the embodiment (b). The halogen atom which is one of the substituents to be selected in the embodiment (a) mentioned above does not need to be particularly restricted. It may be selected among a fluorine atom, a chlorine atom, a bromine atom, and an iodine atom and a fluorine atom and a chlorine atom are preferably selected. The fluorine atom is particularly preferably chosen. In either of the embodiments (a) and (b), $SR^1$ or $OR^2$ is substituted at one or more of $Z_2$, $Z_3$, $Z_6$, $Z_7$, $Z_{10}$, $Z_{11}$, $Z_{14}$, and $Z_{15}$, preferably $SR^1$ or $OR^2$ is substituted at not less than four of them, and particularly preferably $SR^1$ or $OR^2$ is substituted at all of them. This substitution can manifests excellent effects in elongating the wavelength for absorption, controlling the substituted positions to be made when the substitution with an amino compound is effected subsequently to the substitution with $SR^1$ or $OR^2$ during the stage of production, and enhancing the compatibility of the phthalocyanine with a resin.

In the formula (1) mentioned above, $Z_1$, $Z_4$, $Z_5$, $Z_8$, $Z_9$, $Z_{12}$, $Z_{13}$, and $Z_{16}$ (referred to occasionally as substituents at any of 8 α positions of the phthalocyanine ring) independently stand for $NHR^3$, $SR^1$, $OR^2$, or a halogen atom, provided that at least one of them stands for $NHR^3$ and at least four of them stand for $OR^2$ in the embodiment (a); and independently stand for $NHR^3$, $SR^1$, $OR^2$, or a fluorine atom, provided that at least one of them stands for $NHR^3$ and at least four of them stand for $OR^2$ in the embodiment (b). The halogen atom which is one of the substituents to be selected in the embodiment (a) mentioned above does not need to be particularly restricted. It may be selected among a fluorine atom, a chlorine atom, a bromine atom, and an iodine atom and a fluorine atom and a chlorine atom are preferably selected. The fluorine atom is particularly preferably chosen. In either of the embodiments (a) and (b), $NHR^3$ is substituted at one or more of $Z_1$, $Z_4$, $Z_5$, $Z_8$, $Z_9$, $Z_{12}$, $Z_{13}$, and $Z_{16}$ and $OR^2$ is substituted at four or more of them, and preferably $NHR^3$ is substituted at two to four of them and $OR^2$ is substituted at four or five of them (naturally, the total number of these two substituents as just mentioned does not exceed 8). This substitution proves to be favorable because it manifests prominent effects in elongating the wavelength for absorption and enhancing the compatibility of the phthalocyanine with a resin.

In the formula (1), at according to the embodiment (b), least one of $Z_1$ to $Z_{16}$ stands for a fluorine atom. Preferably, of the substituents linked to the eight a positions of the phthalocyanine ring, two to three are each $NHR^3$, four are each $OR^2$, and the remainder, one to two, are each a fluorine atom. This embodiment is effective in facilitating the synthesis, producing the phthalocyanine compound at a low cost, improving the compatibility with a resin as compared with those having a hydrogen atom and other halogen atoms, and enhancing the lightfastness and the heat-resistance, as well as in enabling the wavelength of absorption to be controlled (elongated).

In both the embodiments (a) and (b), $R^1$, $R^2$, and $R^3$ in the substituents represented by $SR^1$, $OR^2$, $NHR^3$, respectively, stand independently for a substituted or non-substituted phenyl group, a substituted or non-substituted aralkyl group, or a substituted or non-substituted alkyl group of 1 to 20 carbon atoms. In this invention, when a plurality of $R^1$'s are present in the formula (1), these $R^1$'s may be the same or different to each other, which can be similarly applied to the case when a plurality of $R^2$'s or $R^3$'s are present in the formula (1).

The "aralkyl group" used herein includes, but not limited to, benzyl, phenethyl, diphenylmethyl.

As typical examples of the substituent optionally linked to the phenyl group or the aralkyl group mentioned above, halogen atoms, acyl groups, alkyl groups, phenyl groups, alkoxyl groups, halogenated alkyl groups, halogenated alkoxyl groups, nitro groups, amino groups, alkyl amino groups, alkylcarbonyl amino groups, aryl amino groups, arylcarbonyl amino groups, carbonyl groups, alkoxycarbonyl groups, alkylamino carbonyl groups, alkoxyy sulfonyl groups, alkylthio groups, carbamoyl group, aryloxy carbonyl group, oxyalkyl ether groups, and cyano groups may be cited, though not exclusively. One to five such substituents may be linked to the phenyl group or the aralkyl group. When a plurality of such substituents are involved in the linkage, they may be identical or not identical in kind. More specific examples of a part of the substituents mentioned above will be described below.

First, typical examples of the halogen atom counted among the substituents optionally involved in the linkage to the phenyl group or the aralkyl group mentioned above include a fluorine atoms, a chlorine atom, a bromine atom, and an iodine atom, preferably chlorine atom.

Then, typical examples of the acyl group counted among the substituents optionally involved in the linkage to the phenyl group or the aralkyl group mentioned above include an acetyl group, an ethylcarbonyl group, a propylcarbonyl group, a butylcarbonyl group, a pentylcarbonyl group, a hexylcarbonyl group, a benzoyl group, and a p-t-butylbenzoyl group, preferably an ethylcarbonyl group.

Typical examples of the alkyl group counted among the substituents optionally involved in the linkage to the phenyl group or the aralkyl group are linear, branched, or cyclic alkyl groups of 1 to 20 carbon atoms, preferably linear, branched, or cyclic alkyl groups of 1 to 8 carbon atoms. As typical examples of the alkyl group, a methyl group, an ethyl group, an n-propyl group, an isopropyl group, an n-butyl group, an isobutyl group, a sec-butyl group, a tert-butyl group, an n-pentyl group, an isopentyl group, a neopentyl group, an 1,2-dimethyl propyl group, an n-hexyl group, a cyclohexyl group, an 1,3-dimethyl butyl group, an 1-isopropyl propyl group, an 1,2-dimethyl butyl group, an n-heptyl group, an 1,4-dimethyl pentyl group, a 2-methyl-1-isopropyl propyl group, an 1-ethyl-3-methyl butyl group, an n-octyl group, and a 2-ethylhexyl group may be cited. Among other alkyl groups mentioned above, a methyl group and an ethyl group prove particularly preferable.

Typical examples of the alkoxyl group counted among the substituents optionally involved in the linkage to the phenyl group or the aralkyl group mentioned above are linear, branched, or cyclic alkoxyl groups of 1 to 20 carbon atoms, preferably linear, branched, or cyclic alkoxyl groups of 1 to 8 carbon atoms. As typical examples of the alkoxyl group, a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a neopentyloxy group, an 1,2-dimethyl-propoxy group, an n-hexyloxy group, a cyclohexyloxy group, an 1,3-dimethylbutoxy group, and an 1-isopropylpropoxy group may be sited. Among other alkoxyl groups mentioned above, a methoxy group and an ethoxy group prove particularly preferable.

Typical examples of the halogenated alkyl group counted among the substituents optionally involved in the linkage to the phenyl group or the aralkyl group mentioned above are partially halogenated linear, branched, or cyclic alkyl groups of 1 to 20 carbon atoms, preferably partially halogenated linear, branched, or cyclic alkyl groups of 1 to 8 carbon atoms. As typical examples of the halogenated alkyl group, a chloromethyl group, a bromomethyl group, a trifluoromethyl group, a chloroethyl group, a 2,2,2-trichloroethyl group, a bromoethyl group, a chloropropyl group, and a bromopropyl group may be cited.

Typical examples of the halogenated alkoxyl group counted among the substituents optionally involved in the linkage to the phenyl group or the aralkyl group mentioned above are partially halogenated linear, branched, or cyclic alkoxyl groups of 1 to 20 carton atoms, preferably partially halogenated linear, branched, or cyclic alkoxyl groups of 1 to 8 caron atoms. As typical examples of the halogenated alkoxyl group, a chloromethoxy group, a bromomethoxy group, a trifluoromethoxy group, a chloroethoxy group, a 2,2,2-trichloroethoxy group, a bromoethoxy group, a chloropropoxy group, and a bromopropoxy group may be cited.

Typical examples of the alkylamino group counted among the substituents optionally involved in the linkage to the phenyl group or the aralkyl group mentioned above are alkylamino groups containing an alkyl site of 1 to 20 carbon atoms, preferably alkylamino groups containing an alkyl site of 1 to 8 carbon atoms. As typical examples of the alkylamino group, a methylamino group, an ethylamino group, an n-propylamino group, an n-butylamino group, a sec-butylamino group, an n-pentylamino group, an n-hexylamino group, an n-heptylamino group, an n-octylamino group, and a 2-ethylhexylamino group may be cited. Among other alkylamino groups mentioned above, a methylamino group, an ethylamino group, an n-propylamino group, and an n-butylamino group prove particularly preferable.

Typical examples of the alkoxycarbonyl group counted among the substituents optionally existing in the phenyl group or the aralkyl group mentioned above are alkoxycarbonyls of 1 to 8 carbon atoms, preferably 1 to 5 carbon atoms, optionally containing a hetero atom in the alkyl group moiety of the alkoxyl group or cyclic alkoxycarbonyls of 3 to 8 carbon atoms, preferably 5 to 8 carbon atoms, optionally containing a hetero atom. As typical examples of the alkoxycarbonyl group, a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, and a tert-butoxycarbonyl group may be cited. Among other alkoxycarbonyl groups mentioned above, a methoxycarbonyl group and an ethoxycarbonyl group prove particularly preferable.

The unsubstituted alkyl groups of 1 to 20 carbon atoms may be any of linear, branched, or cyclic alkyl groups of 1 to 20 carbon atoms, preferably linear, branched, or cyclic alkyl groups of 1 to 8 carbon atoms. As typical examples of the unsubstituted alkyl group, a methyl group, an ethyl group, an n-propyl group, an isopropyl group, an n-butyl group, an isobutyl groups, a sec-butyl group, a tert-butyl group, an n-pentyl group, an isopentyl group, a neopentyl group, an 1,2-dimethyl propyl group, an n-hexyl group, a cyclohexyl group, an 1,3-dimethyl butyl group, an 1-isopropyl propyl group, an 1,2-dimethyl butyl group, an n-heptyl group, an 1,4-dimethyl pentyl group, a 2-methyl-1-isopropyl propyl group, an 1-ethyl-3-methyl butyl group, an n-octyl group, and a 2-ethyl hexyl group may be cited, Among other unsubstituted alkyl groups mentioned above, a methyl group, an ethyl group, an n-propyl group, an isopropyl group, and an n-butyl group prove particularly preferable.

As typical examples of the substituent optionally allowed to exist in the alkyl group of 1 to 20 carbon atoms mentioned above, halogen atoms, alkoxyl groups, hydroxyalkoxyl groups, alkoxyalkoxyl groups, halogenated alkoxyl groups, nitro groups, amino groups, alkyl amino groups, alkoxy carbonyl groups, alkylamino carbonyl groups, and alkoxysulfonyl groups may be cited, though not exclusively. When a plurality of substituents are involved herein, they may be identical or not identical in kind. Since the more typical examples of a part of these substituents may be those already cited above as more typical examples of a part of the substituents optionally existing in the phenyl group or the aralkyl group mentioned above, they will be omitted from the description given herein.

As typical examples of the phthalocyanine compound of the formula (1) having a nonmetal for M, the compounds cited below may be cited. The phthalocyanine compound of this invention does not need to be limited to these typical examples. It goes without saying that when the phthalocyanine compounds cited herein below are proper metals, metal oxides, or metal halides other than nonmetals, they are embraced by this invention. In the following compounds, the 3, 6 positions are the substitutions at the a position (the sites of substitution of $Z_1$ $Z_4$, $Z_5$, $Z_8$, $Z_9$, $Z_{12}$, $Z_{13}$, and $Z_{16}$) of the phthalocyanine ring and the 4, 5 positions are the substitutions at the β position (the sites of substitution of $Z_2$, $Z_3$, $Z_6$, $Z_7$, $Z_{10}$, $Z_{11}$, $Z_{14}$, and $Z_{15}$) of the phthalocyanine ring. In the abbreviations of the following compounds, Pc stands for a phthalocyanine ring, the eight substituents linked to the β position are indicated immediately after the Pc, and the eight substituents linked to the α position are indicated after the substituents linked to the β position.

4,5-Octakis(phenoxy)-3,6-{tetrakis(phenoxy)-tris(anilino)-fluoro}phthalocyanine, Abbreviation;Pc(PhO)$_8$(PhO)$_4$(PhNH)$_3$F;

4,5-Octakis(2,6-dichlorophenoxy)-3,6-{tetrakis(2,6-dimethylphenoxy)-tris(DL-1-phenylethylamino)-fluoro}phthalocyanine, Abbreviation;Pc(2,6-Cl$_2$PhO)$_8$\{2,6-(CH$_3$)$_2$PhO\}$_4$\{Ph(CH$_3$)CHNH\}$_3$F;

4,5-Octakis(2,6-dichlorophenoxy)-3,6-{tetrakis(2,6-dimethylphenoxy)-tris(benzylamino)-fluoro}phthalocyanine, Abbreviation;Pc(2,6-Cl$_2$PhO)$_8$\{2,6-(CH$_3$)$_2$PhO\}$_4$\{PhCH$_2$NH\}$_3$F;

4,5-Octakis(2,6-dichlorophenoxy)-3,6-{tetrakis(2,6-dibromo-4-methylphenoxy)-tris(DL-1-phenylethylamino)-fluoro}phthalocyanine, Abbreviation;Pc(2,6-Cl$_2$PhO)$_8$\{2,6-(Br)$_2$-4-(CH$_3$)PhO\}$_4$\{Ph(CH$_3$)CHNH\}$_3$F;

4,5-Octakis(2,5-dichlorophenoxy)-3,6-{tetrakis(2,6-dimethylphenoxy)-tris(DL-1-phenylethylamino)-fluoro}phthalocyanine, Abbreviation;Pc(2,5-Cl$_2$PhO)$_8$\{2,6-(CH$_3$)$_2$PhO\}$_4$\{Ph(CH$_3$)CHNH\}$_3$F;

4,5-Octakis(2,5-dichlorophenoxy)-3,6-{tetrakis(2,6-dimethylphenoxy)-tris(benzylamino)-fluoro}phthalocyanine, Abbreviation;Pc(2,5-Cl$_2$PhO)$_8$\{2,6-(CH$_3$)$_2$PhO\}$_4$(PhCH$_2$NH)$_3$F;

4,5-Octakis(2,5-dichlorophenoxy)-3,6-{tetrakis(2,6-dibromo-4-methylphenoxy)-tris(DL-1-phenylethylamino)-fluoro}phthalocyanine, Abbreviation;Pc(2,5-Cl$_2$PhO)$_8$\{2,6-(Br)$_2$-4-(CH$_3$)PhO\}$_4$\{Ph(CH$_3$)CHNH\}$_3$F;

4,5-Octakis(2,5-dichlorophenoxy)-3,6-{tetrakis(2,6-dibromo-4-methylphenoxy)-bis(DL-1- phenylethylamino)-difluoro}phthalocyanine,; Abbreviation;Pc(2,5-Cl$_2$PhO)$_8${2,6-(Br)$_2$-4-(CH$_3$)PhO}$_4${Ph(CH$_3$)CHNH}$_2$F$_2$;

4,5-Octakis(4-cyanophenoxy)-3,6-{tetrakis(2,6-dimethylphenoxy)-tris(DL-1-phenylethylamino)-fluoro}phthalocyanine, Abbreviation;Pc(4-CNPhO)$_8${2,6-(CH$_3$)$_2$PhO}$_4${Ph(CH$_3$)CHNH}$_3$F;

4,5-Octakis(4-cyanophenoxy)-3,6-{tetrakis(2,6-dimethylphenoxy)-tris(benzylamino)-fluoro}phthalocyanine, Abbreviation;Pc(4-CNPhO)$_8${2,6-(CH$_3$)$_2$PhO}$_4${PhCH$_2$NH}$_3$F;

4,5-Octakis(4-cyanophenoxy)-3,6-{tetrakis(2,6-dibromo-4-methylphenoxy)-tris(DL-1-phenylethylamino)-fluoro}phthalocyanine, Abbreviation;Pc(4-CNPhO)$_8${2,6-(Br)$_2$-4-(CH$_3$)PhO}$_4${Ph(CH$_3$)CHNH}$_3$F;

4,5-{tetrakis(butoxy)-tetrakis(2,6-dimethylphenoxy)}-3,6-{tetrakis(2,6-dimethylphenoxy)-tris(benzylamino)-fluoro}phthalocyanine, Abbreviation;Pc(BuO)$_4${2,6-(CH$_3$)$_2$PhO}$_4${2,6-(CH$_3$)$_2$PhO}$_4${PhCH$_2$NH}$_3$F;

4,5-Octakis(phenylthio)-3,6-{tetrakis(2,6-dimethylphenoxy)-tris(benzylamino)-fluoro}phthalocyanine, Abbreviation;Pc(PhS)$_8${2,6-(CH$_3$)$_2$PhO}$_4$(PhCH$_2$NH)$_3$F;

4,5-Octakis(phenylthio)-3,6-{tetrakis(2,6-dimethylphenoxy)-tris(anilino)-fluoro}phthalocyanine, Abbreviation;Pc(PhS)$_8${2,6-(CH$_3$)$_2$PhO}$_4$(PhNH)$_3$F;

4,5-Octakis(butylthio)-3,6-{tetrakis(2,6-dimethylphenoxy)-tris(benzylamino)-fluoro}phthalocyanine, Abbreviation;Pc(BuS)$_8${2,6-(CH$_3$)$_2$PhO}$_4$(PhCH$_2$NH)$_3$F;

4,5-{tetrakis(butoxy)-tetrakis(phenylthio)}-3,6-{tetrakis(2,6-dimethylphenoxy)-tris(DL-1-phenylethylamino)-fluoro}phthalocyanine, Abbreviation;Pc(BuO)$_4$(PhS)$_4${2,6-(CH$_3$)$_2$PhO}$_4${Ph(CH$_3$)CHNH}$_3$F;

4,5-Octakis(phenoxy)-3,6-{tetrakis(phenoxy)-tris(benzylamino)-chloro}phthalocyanine, Abbreviation;Pc(PhO)$_8$(PhO)$_4$(PhCH$_2$NH)$_3$Cl;

4,5-Octakis(2,5-dichlorophenoxy)-3,6-{tetrakis(2,6-dimethylphenoxy)-tetrakis(DL-1-phenylethylamino)}phthalocyanine, Abbreviation;Pc(2,5-Cl$_2$PhO)$_8${2,6-(CH$_3$)$_2$PhO}$_4${Ph(CH$_3$)CHNH}$_4$;

4,5-Octakis(2,5-dichlorophenoxy)-3,6-{tetrakis(2,6-dimethylphenoxy)-tetrakis(benzylamino)}phthalocyanine, Abbreviation;Pc(2,5-Cl$_2$PhO)$_8${2,6-(CH$_3$)$_2$PhO}$_4$(PhCH$_2$NH)$_4$;

4,5-Octakis(2,5-dichlorophenoxy)-3,6-{tetrakis(2,6-dibromo-4-methylphenoxy)-tetrakis(DL-1-phenylethylamino)}phthalocyanine, Abbreviation;Pc(2,5-Cl$_2$PhO)$_8${2,6-(Br)$_2$-4-(CH$_3$)PhO}$_4${Ph(CH$_3$)CHNH}$_4$;

4,5-Octakis(2,6-dichlorophenoxy)-3,6-{tetrakis(2,6-dibromo-4-methylphenoxy)-tetrakis(DL-1-phenylethylamino)}phthalocyanine, Abbreviation;Pc(2,6-Cl$_2$PhO)$_8${2,6-(Br)$_2$-4-(CH$_3$)PhO}$_4${Ph(CH$_3$)CHNH}$_4$;

4,5-Octakis(4-cyanophenoxy)-3,6-{tetrakis(2,6-dimethylphenoxy)-tetrakis(DL-1-phenylethylamino)}phthalocyanine, Abbreviation;Pc(4-CNPhO)$_8${2,6-(CH$_3$)$_2$PhO}$_4${Ph(CH$_3$)CHNH}$_4$;

4,5-Octakis(4-cyanophenoxy)-3,6-{tetrakis(2,6-dimethylphenoxy)-tetrakis(benzylamino)}phthalocyanine, Abbreviation;Pc(4-CNPhO)$_8${2,6-(CH$_3$)$_2$PhO}$_4$(PhCH$_2$NH)$_4$;

4,5-Octakis(4-cyanophenoxy)-3,6-{tetrakis(2,6-dibromo-4-methylphenoxy)-tetrakis(DL-1-phenylethylamino)}phthalocyanine, Abbreviation;Pc(4-CNPhO)$_8${2,6-(Br)$_2$-4-(CH$_3$)PhO}$_4${Ph(CH$_3$)CHNH}$_4$;

4,5-{tetrakis(butoxy)-tetrakis(2,6-dimethylphenoxy)}-3,6-{tetrakis(2,6-dimethylphenoxy)-tetrakis(benzylamino)}phthalocyanine, Abbreviation;Pc(BuO)$_4${2,6-(CH$_3$)$_2$PhO}$_4${2,6-(CH$_3$)$_2$PhO}$_4${PhCH$_2$NH}$_4$;

4,5-Octakis(phenylthio)-3,6-{tetrakis(2,6-dimethylphenoxy)-tetrakis(benzylamino)}phthalocyanine, Abbreviation;Pc(PhS)$_8${2,6-(CH$_3$)$_2$PhO}$_4$(PhCH$_2$NH)$_4$;

4,5-Octakis(phenylthio)-3,6-{tetrakis(2,6-dimethylphenoxy)-tetrakis(anilino)}phthalocyanine, Abbreviation;Pc(PhS)$_8${2,6-(CH$_3$)$_2$PhO}$_4$(PhNH)$_4$;

4,5-Octakis(butylthio)-3,6-{tetrakis(2,6-dimethylphenoxy)-tetrakis(benzylamino)}phthalocyanine, Abbreviation;Pc(BuS)$_8${2,6-(CH$_3$)$_2$PhO}$_4$(PhCH$_2$NH)$_4$; and 4,5-{tetrakis(butoxy)-tetrakis(phenylthio)}-3,6-{tetrakis(2,6-dimethylphenoxy)-tetrakis(DL-1-phenylethylamino)}phthalocyanine, Abbreviation;Pc(BuO)$_4$(PhS)$_4${2,6-(CH$_3$)$_2$PhO}$_4${Ph(CH$_3$)CHNH}$_4$.

The method for the production of the phthalocyanine compound of this invention does not need to be particularly limited but may be properly selected among the methods known to be art. The method which comprises subjecting a phthalonitrile compound and a metal salt in a molten state or in an organic solvent to cyclization and then causing the cyclized product to react further with an amino compound can be used particularly favorably.

According to the second aspect, therefore, this invention is to provide a method for the production of the phthalocyanine compound of this invention, which comprises subjecting a phthalonitrile compound (1) represented by the following formula (2):

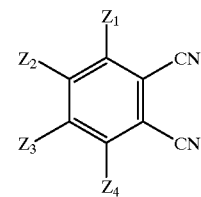

(2)

a phthalonitrile compound (2) represented by the following formula (3):

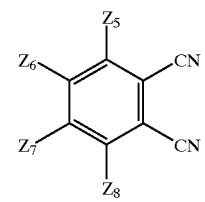

(3)

a phthalonitrile compound (3) represented by the following formula (4):

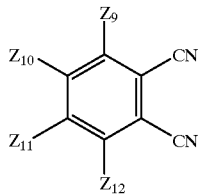

(4)

and a phthalonitrile compound (4) represented by the following formula (5):

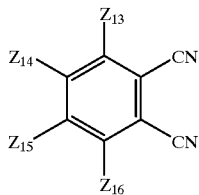

(5)

wherein in the formulae (2) to (5), $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $SR^1$, $OR^2$, or a halogen atom, provided that at least one of them stands for $SR^1$ or a halogen atom and at least four of them stand for $OR^2$; and a plurality of $R^1$ and $R^2$, independently to each other, stand for a substituted or non-substituted phenyl group, a substituted or non-substituted aralkyl group, or a substituted or non-substituted alkyl group of 1 to 20 carbon atoms, with one member selected from the group consisting of metal oxides, metal carbonyls, metal halides and organic acid metals, and thereafter reacting the resultant reaction product with an amine compound of the formula (6): $NH_2R^3$, wherein $R^3$ stands for a substituted or non-substituted phenyl group, a substituted or non-substituted aralkyl group, or a substituted or non-substituted alkyl group of 1 to 20 carbon atoms.

In this embodiment, the symbols $Z_2$, $Z_3$, $Z_6$, $Z_7$, $Z_{10}$, $Z_{11}$, $Z_{14}$, $Z_{15}$, $Z_1$, $Z_4$, $Z_5$, $Z_8$, $Z_9$, $Z_{12}$, $Z_{13}$, $Z_{16}$, $R^1$, $R^2$ and $R^3$ used in the formula (2) to (5) and the formula (6) have the same meanings as in the formula (1) mentioned above.

In this embodiment, when the phthalonitrile compounds (1) to (4) are subjected to cyclization with one member selected from the group consisting of metal oxides, metal carbonyls, metal halides, and organic acid metals, a phthalocyanine derivative having no $NH_2R^3$ at the α position, i.e., a phthalocyanine derivative represented by the following formula (1):

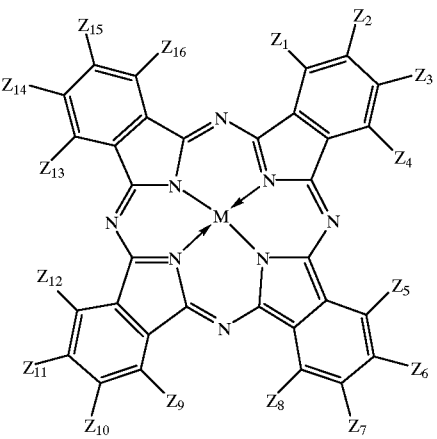

(1)

wherein in the formulae (2) to (5), $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $SR^1$, $OR^2$, or a halogen atom, provided that at least one of them stands for $SR^1$ or a halogen atom and at least four of them stand for $OR^2$; and a plurality of $R^1$ and $R^2$, independently to each other, stand for a substituted or non-substituted phenyl group, a substituted or non-substituted aralkyl group, or a substituted or non-substituted alkyl group of 1 to 20 carbon atoms, (hereinafter referred to simply as "phthalocyanine derivative") is synthesized. Then, by causing the phthalocyanine derivative synthesized as described above to react with an amino compound of the formula (6), the phthalocyanine compound of this invention is produced.

The method of the second aspect of this invention utilizes the fact that the reactivity for the nucleophilic substitution with the amino group of the formula (6) increases in order of the halogen atom and the $SR^1$ and the $OR^2$ shows substantially no reactivity for the nucleophilic substitution. Specifically, by the method of this invention, the $NHR^3$ group is formed by means of the reaction of nucleophilic substitution of the $SR^1$ or the halogen atom, particularly the halogen atom, at the α position with the amino compound of the formula (6). For the purpose of enabling the $NHR^3$ group to be introduced efficiently at a desired a position of the phthalocyanine skeleton and, at the same time, effecting the accurate control of the position of introducing the substituents, therefore, the second aspect prefers the substituents at the β position, namely $Z_2$, $Z_3$, $Z_6$, $Z_7$, $Z_{10}$, $Z_{11}$, $Z_{14}$, and $Z_{15}$, to stand for independently $SR^1$ or $OR^2$, particularly $OR^2$, the substituents at the a position, namely $Z_1$, $Z_4$, $Z_5$, $Z_8$, $Z_9$, $Z_{12}$, $Z_{13}$, and $Z_{16}$ to stand for independently $SR^1$ or a halogen atom, particularly a halogen atom.

In this aspect, the phthalonitrile compounds of the formulas (2) to (5) which are starting raw materials can by synthesized by methods heretofore known to the art such as, for example, the method disclosed in JP-A-64-45,474. Though commercially available products may be used instead, they are preferably obtained by causing a phthalonitrile derivative represented by the following formula (6):

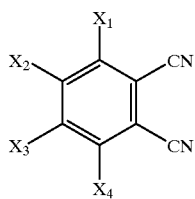

(6)

wherein $X_1$, $X_2$, $X_3$, and $X_4$ independently stand for a halogen atom such as a fluorine atom, a chlorine atom, a bromine atom, and an iodine atom, preferably a fluorine atom and a chloride atom, and particularly a fluorine atom, to react with $HSR^1$ and/or $HOR^2$. In this case, the ratio of $HSR^1$ and $HOR^2$ may be suitably selected, depending on the structure of the phthalonitrile compound aimed at. Though the total amount of $HSR^1$ and/or $HOR^2$ to be used does not need to be particularly restricted so long as the relevant reaction can proceed and produce the phthalonitrile compound to be expected, it is generally in the range of 1.0 to 6.0 mols, preferably 1.1 to 2.5 mols, based on one mol of the phthalonitrile derivative.

In the preferred embodiment described above, though the reaction of the phthalonitrile derivative with $HSR^1$ and/or $HOR^2$ may be carried out either in the absence of a solvent or in an organic solvent, it is preferred to be performed in an organic solvent. As typical examples of the organic solvent which can be used herein, nitrites such as acetonitrile and benzonitrile; and polar solvents such as acetone and 2-butanone may be cited. Among other organic solvents mentioned above, acetonitrile, benzonitrile, and acetone prove particularly advantageous. In the case of using an organic solvent, the amount of the organic solvent to be used may be such that the concentration of the phthalonitrile derivative falls generally within the range of 2 to 40 (w/v) %, preferably 10 to 30 (w/v) %. Since the reaction of the phthalonitrile derivative with $HSR^1$ and/or $HOR^2$ generates hydrogen halide (such as, for example, hydrogen fluoride), a trapping agent is preferably used in order to remove the hydrogen halide. As typical examples of the trapping agent usable herein, calcium carbonate, calcium hydroxide, magnesium hydroxide, and magnesium carbonate may be cited. Among other trapping agents mentioned above, calcium carbonate and calcium hydroxide prove particularly advantageous. The amount of the trapping agent to be used does not need to be particularly restricted so long as it suffices to effect efficiently the removal of the hydrogen halide generated during the course of the reaction. It is generally in the range of 1.0 to 4.0 mols, preferably 1.1 to 2.0 mols, based on one mol of the phthalonitrile derivative.

In this embodiment, the cyclization of the phthalonitrile compounds of the formulas (2) to (5) with at least one member selected from the group consisting of metals, metal oxides, metal carbonyls, metal halides, and organic acid metals may be preferably carried out either in a molten state or in an organic solvent. The metals, metal oxides, metal carbonyls, metal halides, and organic acid metals (hereinafter referred to collectively as "metal compounds") which can be used herein do not need to be particularly restricted but are required only to be capable of producing substances corresponding to those of M in the phthalocyanine compound of the formula (1) obtained after the reaction. As typical examples of the metal compound, the metals such as iron, copper, zinc, vanadium, titanium, indium, and tin which are cited as for the symbol "M" in the formula (1), metal halides such as chlorides, bromides, and iodides of the metals mentioned above, metal oxides such as vanadium oxide, titanium oxide, and copper oxide, organic acid metals such as acetates, complex compounds such as acetyl acetonate, and metal carbonyls such as carbonyl iron may be cited. Among other metal compounds mentioned above, metals, metal oxides, and metal halides prove particularly favorable.

In the embodiment mentioned above, though the cyclization can be carried out in the absence of a solvent, it is preferred to be performed in the presence of an organic solvent. The organic solvent has only to be an inert solvent which manifests only low, preferably no, reactivity with the phthalonitrile compound as the starting raw material. As typical examples of the organic solvent, inert solvents such as benzene, toluene, xylene, nitrobenzene, monochlorobenzene, dichlorobenzene, trichlorobenzene, 1-chloronaphthalene, 1-methyl-naphthalene, ethylene glycol, and benzonitrile; and nonprotic polar solvents such as pyridine, N,N-dimethylformamide, N-methyl-2-pyrroridinone, N,N-dimethyl acetophenone, triethyl amine, tri-n-butyl amine, dimethyl sufoxide, and sulfolane may be cited. Among other organic solvents mentioned above, 1-chloronaphthalene, 1-methylnaphthalene, and benzonitrile are used preferably and benzonitrile is used more preferably.

In the embodiment mentioned above, the reaction conditions for the phthalonitrile compounds of the formulas (2) to (5) with the metal compound do not need to be particularly restricted but are only required to permit the advance of the reaction. For example, the phthalonitrile compounds (1) to (4) are charged in a total amount in the range of 2 to 40 parts (meaning "parts by mass" hereinafter), preferably 20 to 35 parts, based on 100 parts of the organic solvent, and at the same time, the metal compound is charged in an amount in the range of 1 to 2 mols, preferably 1.1 to 1.5 mols, based on 4 mols of the phthalonitrile compounds and the reaction thereof is performed at a temperature in the range of 30 to 250° C., preferably 80 to 200° C. After the reaction, by filtering, washing, and drying the product by this reaction in accordance with the known method for synthesizing a phthalocyanine compound, the phthalocyanine derivative which can be used in the next step can be obtained efficiently with a high purity.

In this embodiment, the reaction of the phthacyanine derivative with the amino compound of the formula (6) may be implemented by mixing them, when necessary, in the presence of an inert liquid manifesting no reactivity to the compounds used for the reaction and heating them to a prescribed temperature. Preferably, the reaction is carried out by heating the reactants at a prescribed temperature in the amino compound to be used for the reaction. As typical examples of the inert liquid, nitrites such as benzonitrile and acetonitrile and amides such as N-methylpyrrolidone and dimethyl formamide may be cited. These inert liquids may be used either singly or in the form of a mixture of two or more members.

In the reaction mentioned above, the reaction conditions may be suitably selected in the optimum ranges so as to introduce the substituents at positions designed in the positions of substitution of $Z_1$ to $Z_{16}$ of the phthalocyanine compound of the formula (1) aimed at by this invention. For example, the following conditions may be used. Specifically, the amino compound ($NH_2R^3$) of the formula (6) is charged generally in an amount of not less than an equimolar amount, preferably in an amount in the range of 8 to 36 mols, based on one mol of the phthalocyanine derivative obtained in consequence of the cyclization of the phthalonitrile compounds with the metal compound. Then, to the reaction product is charged an inorganic component such as calcium carbonate, or calcium hydroxide which serves as a trapping agent for trapping the hydrogen halide to be subsequently generated, in an amount in the range of 1 to 16 mols, preferably 3 to 8 mols, per mol of the phthalocyanine derivative. The trapping agent which can be used herein is the same as in the cyclization mentioned above. The reaction temperature in the case of reacting with an alkyl amino compound is in the range of 20 to 200° C., preferably 30 to 150° C. and the reaction temperature in the case of reacting with an aryl amino compound is in the range of 80 to 250° C., preferably 100 to 200° C. Incidentally, after the reaction, by filtering the reaction mixture thereby separating the inorganic component and distilling (washing) the residue thereby expelling the amino compound in accordance with the known method of synthesis resorting to the reaction of substitution of the phthalocyanine compound, the phthalocyanine compound of this invention aimed at can be obtained efficiently with a high purity without having to undergo complicated steps.

According to the third aspect, the near infrared absorption dye of this invention is formed by using a phthalocyanine compound of the formula (1) of this invention which, in a solution containing the phthalocyanine compound of the formula (1) at a concentration such that the lowest value of the transmittance at 750 to 1050 nm falls in the range of 5 to 6%, exhibits a transmittance of not less than 65% to the visible light in the determination of transmission spectrum.

To be specific, the near infrared absorption dye of this invention manifests high transmittance to the visible light, excels in the ability to absorb near infrared ray, and permits highly efficient cut of the near infrared ray. Further, since it exhibits excellent compatibility with a resin and excels in such properties as heat-resistance, light-fastness, and weatherability, it can be used advantageously in various applications such as heat ray shielding materials and plasma display grade filters. It can be also highly useful for a noncontact fixing toner such as flash fixture and as a near infrared absorbent for heat-retaining and heat-accumulating fibers.

The phthalocyanine compound which can be used in the near infrared absorption dye of this invention is that portion of the phthalocyanine compound represented by the formula (1) mentioned above which, in a solution containing the portion of the phthalocyanine compound at a concentration such that the lowest value of the transmittance at 750 to 1050 nm falls in the range of 5 to 6%, exhibits a transmittance of not less than 65%, preferably not less than 70%, to the visible light in the determination of transmission spectrum. As typical examples of the preferable near infrared absorption dye of this invention, the typical examples of the phthalocyanine compound represented by the formula (1) cited above may be cited here again.

As typical examples of the solvent used for the specification of the lowest value of the transmittance at 750 to 1050 nm and the transmittance to the visible light in the determination of the transmittance spectrum of the near infrared absorption dye of this invention, chloroform, toluene, tetrahydrofuran, and acetone may be cited, though not exclusively. When another solvent is used, the lowest value of transmittance at 750 to 1,050 nm and the transmittance to the visible light which are different to a certain extent from the ranges mentioned above are assigned to this particular solvent. Needless to mention, this difference does not constitute itself an essential deviation from this invention. The near infrared absorption dye of this invention has as the necessary condition the determination of the lowest value of transmittance at 750 to 1,050 nm and the transmittance to the visible light by the use of a sample in the state of a solution. The reason for this necessary condition is that the absorption spectrum of the phthalocyanine compound is varied by the state thereof (such as, for example, the state of an aggregate of crystals and the state of a solution) and, as a result, the lowest value of transmittance at 750 to 1,050 nm and the transmittance to the visible light are varied to a certain extent. In consideration of the state of use of the near infrared absorption dye in the heat ray shielding material, plasma display grade filter, noncontact fixing toner, or heat-retaining and heat-accumulating fibers, namely the state of intimate dispersion in resin, the state of a solution which gives the lowest value of transmittance and the transmittance to the visible ray conforming to (closely approximating) those obtained in the state of use has been adopted as the necessary condition.

According to the fourth aspect, the heat ray shielding material of this invention comprises at least one member selected from the group consisting of the phthalocyanine compounds according to the first aspect of this invention, the phthalocyanine compounds produced by the method according to the second aspect of this invention, and the near infrared absorption dyes according to the third aspect of this invention plus a resin, the amount of the phthalocyanine compound and/or near infrared absorption dye incorporated being in the range of 0.0005 to 20 parts by weight, preferably 0.0010 to 10 parts by weight, based on 100 parts by weight of the resin.

The phthalocyanine compound which can be properly used in the heat ray shielding material of this invention may be any of the phthalocyanine compounds represented by the formula (1) mentioned above. Preferably, they are phthalocyanine compounds having vanadium, copper, and zinc as the central metal. Typically, the phthalocyanine compounds which are represented by the abbreviations: $VOPc(2,5-Cl_2PhO)_8\{2,6-(CH_3)_2PhO\}_4\{Ph(CH_3)CHNH\}_3F$, $VOPc(2,5-Cl_2PhO)_8\{2,6-(CH_3)_2PhO\}_4(PhCH_2NH)_4$, $CuPc(2,5-Cl_2PhO)_8\{2,6-(CH_3)_2PhO\}_4(PhCH_2NH)_4$, $CuPc(PhS)_8\{2,6-(CH_3)_2PhO\}_4(PhCH_2NH)_4$, $\{VOPc(4-CNPhO)_8\{2,6-Br_2-4-(CH_3)PhO\}_4\{Ph(CH_3)CHNH\}_4$ and $ZnPc(2,6-Cl_2PhO)_8\{2,6-Br_2-4-(CH_3)PhO\}_4\{Ph(CH_3)CHNH\}3F$ may be cited. These phthalocyanine compounds are capable of selectively absorbing the light particularly in the near infrared region and imparting to the heat ray shielding material effects of effectively shielding a heat from a solar light while retaining the transmittance to the light of the visible region at a relatively high level. This is because the phthalocyanine compound has an outstanding ability to absorb selectively a light in a near infrared region, excels in compatibility with a resin, and exhibits excellent quality in heat resistance, light-fastness, and weatherability and, therefore, manifests excellent effects as a heat ray shielding material without impairing the qualities just mentioned. Further, the phthalocyanine compound can be provided as an inexpensive organic material to form the heat ray shielding material and can be extensively utilized in a wide range of heat ray shielding applications. Further, since the phthalocyanine compound excels in heat resistance, it can manifest numerous ideal features as enabling the heat ray shielding material to be manufactured by such forming methods of high productivity as injection molding and extrusion molding using a commonly used thermoplastic resin.

The resin which can be used in the heat ray shielding material of this invention may be suitably selected, depending on the purpose for which the produced heat ray shielding material is used. Preferably, the resin is substantially transparent and does not induce absorption and scattering very heavily. As typical examples of the resin fit for the use herein, polycarbonate resins; (meth)acrylic resins such as methyl methacrylate; polystyrenes; polyvinyl chloride; polyvinyl resins such as polyvinylidene chloride; polyolefin resins such as polyethylene and polypropylene; polybutyral resin; vinyl acetate type resins such as polyvinyl acetate; and polyester resins and polyamide resins may be cited. Besides being used singly, these resins may be used in the form of a blend of two or more members so long as the blend be substantially transparent. Optionally, such a resin may be used as interposed between opposed sheets of transparent glass. Among other resins mentioned above, polycarbonate resin, (meth)acrylic resin, polyester resin, polystyrene resin and polyvinyl chloride which excel in weatherability and transparency prove advantageous and polycarbonate resin, methacrylic resin, polyethylene terephthalte (PET) resin, and polyvinyl chloride prove more advantageous.

The polycarbonate resin is produced by causing a dihydric phenol to react with a carbonate precursor by the solution method or the melting method. As typical examples of the dihydric phenol, 2,2-bis(4-hydroxyphenyl) propane [Bisphenol A], 1,1-bis(4-hydroxyphenyl) ethane, 1,1-bis(4-hydroxyphenyl) cyclohexane, 2,2-bis(4-hydroxy-3,5-dimethylphenyl) propane, 2,4-bis(4-hydroxy-3,5-dibromophenyl) propane, 2,2-bis(4-hydroxy-3-methylphenyl) propane, bis(4-hydroxyphenyl) sulfide, and bis(4-hydroxyphenyl) sulfone may be cited. Preferably, dihydric phenols are bis(4-hydroxyphenyl) alkane type dihydric phenols, particularly those having bisphenol as a main component.

Acrylic resins include methyl methacrylate in its simple form, polymerizing unsaturated monomer mixtures containing not less than 50% of methyl methacrylate, and copolymers of such monomers, for example. As typical examples of the polymerizing unsaturated monomers copolymerizable with methyl methacrylate, methyl acrylate, ethyl (meth) acrylate, butyl (meth)acrylate, cyclohexyl (meth)acrylate, 2-ethylhexyl (meth)acrylate, methoxyethyl (meth)acrylate, ethoxyethyl (meth)acrylate, 2-hydroxyethyl (meth)acrylate, N,N-diethylaminoethyl (meth)acrylate, glycidyl (meth) acrylate, tribromophenyl (meth)acrylate, tetrahydroxy furfuryl (meth)acrylate, ethylene glycol di(meth)acrylate, triethylene glycol di(meth)acrylate, tripropylene glycol di(meth)acrylate, trimethylol ethane di(meth)acrylate, neopentyl glycol di(meth)acrylate, trimethylol propane tri (meth)acrylate, and pentaerythritol tetra(meth)acrylate may be cited.

As the vinyl chloride resin, not only polymers formed solely of vinyl chloride monomer but also copolymers having vinyl chloride as a main component may be usable. As typical examples of the monomer which can be copolymerized with vinyl chloride, vinylidene chloride, ethylene, propylene, acrylonitrile, vinyl acetate, maleic acid, itaconic acid, acrylic acid, and methacrylic acid may be cited.

The heat ray shielding material of this invention may contain therein various additives which are used in the production of ordinary transparent resin materials. As typical examples of the additives, a coloring agent, a polymerization adjusting agent, an antioxidant, an ultraviolet absorbent, a flame-retardant, a plasticizer, a rubber for enhancing shock resistance, and a peeling agent may be cited. As typical examples of the method for mixing the phthalocyanine compound in a transparent resin and ,molding the resultant mixture, the extrusion molding, the injection molding, the cast polymerization, the press molding, the calendar molding, and the cast film-forming process may be cited.

The heat ray shielding material may be otherwise produced by preparing a film containing the phthalocyanine compound of this invention and forming this film into a transparent resin material by the use of a hot press or by a thermal lamination technique. Alternatively, it may be produced by applying an acrylic resin ink or coating material containing the phthalocyanine compound of this invention to a transparent resin material by printing or coating.

Since the phthalocyanine compound to be used in the heat ray shielding material of this invention can manifest excellent heat resistance as compared with a commercially available infrared absorbent, the heat ray shielding material can be formed by such a forming method as injection molding or extrusion molding which uses an acrylic resin, a polycarbonate type resin, or a PET resin and elevates the resin temperature to such a high level as in the range of 200 to 350° C. Thus, a molded article having high satisfactory transparency and excelling in the ability to shield a heat ray can be obtained. The heat ray shielding material has no problem when the molding temperature to be used is less than 200° C.

Further, this invention does not particularly discriminate the heat ray shielding material on account of shape. In addition to such most popular shapes as flat plates and films, various shapes including corrugated plates, spheres, and domes may be cited as typical examples of the shape thereof. Though the amount of the phthalocyanine compound to be incorporated in the heat ray shielding material of this invention may be varied depending on the predetermined magnitude of transmittance of the heat ray shielding material to the light in the visible region and the near infrared region and the thickness of the heat ray shielding material, it is generally in the range of 0.0005 to 20 parts by weight, preferably 0.0010 to 10 parts by weight, based on 100 parts by weight of the transparent resin.

The optimum range for the amount of the phthalocyanine compound to be incorporated as described above varies with the shape of the heat ray shielding material. In the case of producing a heat ray intercepting plate of 3 mm in thickness, for example, the amount is generally in the range of 0.002 to 0.06 part by weight, preferably 0.003 to 0.02 part by weight, based on 100 parts by weight of the resin. In the case of forming a heat ray intercepting plate of 10 mm in thickness, for example, this amount may be properly in the range of 0.0005 to 0.02 part by weight, preferably 0.001 to 0.005 part by weight, based on 100 parts by weight of the resin. In the case of forming a heat ray intercepting film of 10 $\mu$m in thickness, this amount may be properly in the range of 0.1 to 20 parts by weight, preferably 0.5 to 10 parts by weight, based on 100 parts by weight of the resin. To indicate the amount of the phthalocyanine compound to be incorporated in the heat ray shielding material without reference to the thickness thereof, the amount may be properly in the range of 0.01 to 2.0 $g/m^2$, preferably 0.05 to 1.0 $g/m^2$, reduced to as the weight per area projected from above. In this case, if the amount of the phthalocyanine compound to be incorporated is less than 0.01 $g/m^2$, effects for shielding a heat ray would be unduly small. If it exceeds 2.0 $g/m^2$, the produced heat ray shielding material would prove conspicuously expensive and the amount of the visible ray to permeate the material would possibly become unduly small. In the case of the product in such an irregular shape as a corrugated plate, the amount under discussion may well be considered as the weight in an area projected from above. The concentration of the phthalocyanine compound in the produced material may be distributed unevenly so long as the appearance of the material is not impaired by the uneven concentration distribution. Besides being used singly, the phthalocyanine compounds conforming to this invention may be used in the form a mixture of two or more members, as occasion demands. When two such members used in a given mixture have different absorption wavelengths, this mixture possibly brings about improved effects in shielding the heat ray.

When such a material as carbon black which is capable of absorbing a heat ray is used in a specific amount as added to the phthalocyanine compound, the produced mixture possibly allows the amount of the phthalocyanine compound to be reduced to less than half and meanwhile produces heat ray shielding effects on a par with those produced by the material formed solely of the phthalocyanine compound.

According to the fifth aspect, the plasma display grade filter of this invention comprises at least one member selected from the group consisting of the phthalocyanine compounds according to the first aspect of this invention, the phthalocyanine compounds produced by the method according to the second aspect of this invention, and the near infrared absorption dyes according to the third aspect of this invention plus a resin, the amount of the phthalocyanine compound and/or near infrared absorption dye incorporated being in the range of 0.0005 to 20 parts by weight, preferably 0.0010 to 10 parts by weight, based on 100 parts by weight of the resin.

The phthalocyanine compound which can be used in the plasma display grade filter of this invention may be any of the phthalocyanine compounds represented by the formula (1) mentioned above. Preferably, they are phthalocyanine compounds having vanadium, copper, and zinc as the central metal. Typically, the phthalocyanine compounds which are represented by the abbreviations: $VOPc(2,5-Cl_2PhO)_8\{2,6-(CH_3)_2PhO\}_4\{Ph(CH_3)CHNH\}_3F$, $VOPc(2,5-Cl_2PhO)_8\{2,6-(CH_3)_2PhO\}_4(PhCH_2NH)_4$, $CuPc$ $(2,5-Cl_2PhO)_8\{2,6-(CH_3)_2PhO\}_4(PhCH_2NH)_4$, $CuPc(PhS)_8\{2,6-(CH_3)_2PhO\}_4(PhCH_2NH)_4$, $VOPc(4-CNPhO)_8\{2,6-Br_2-4-(CH_3)PhO\}_4\{Ph(CH_3)CHNH\}_4$ and $ZnPc(2,6-Cl_2PhO)_8\{2,6-Br_2-4-(CH_3)PhO\}_4\{Ph(CH_3)CHNH\}_3F$ may be cited. These phthalocyanine compounds can show particularly high transmittance to a visible light, produce a large absorption at 750 to 1050 nm, manifest many outstanding properties in solubility, heat resistance, and light-fastness.

The plasma display grade filter of this invention is formed by incorporating as a basis thereof the phthalocyanine compound represented by the formula (1) mentioned above. The expression "incorporating as a basis" as used herein naturally means that the compound is contained in the interior of the basis and further means that the compound is applied to the surface of the basis and that it is interposed between two opposed pieces of the basis. As typical examples of the basis, a transparent resin sheet, a transparent film, and a transparent glass may be cited. The method for manufacturing the plasma display grade filter of this invention by using the phthalocyanine compound does not need to be particularly restricted. The following three methods, for example, may be used for the manufacture.

Specifically, (1) a method which comprises kneading the phthalocyanine compound in a resin and molding by heating the resultant mixture thereby manufacturing a resin sheet or a film; (2) a method which comprises preparing a coating (in the form of a liquid or a paste) and applying this coating to a transparent resin sheet, a transparent film, or a transparent glass sheet; and (3) a method which comprises causing an adhesive agent to incorporate in the phthalocyanine compound and manufacturing a laminated resin sheet, a laminated resin film, or a laminated glass sheet by using the adhesive agent are the examples.

Firstly, in the method (1) which comprises kneading the phthalocyanine compound in a resin and then molding by heating the resultant mixture, the resin material is preferably capable of forming a resin sheet or a resin film having as high transparency as possible. Typically, vinyl compounds such as polyethylene, polystyrene, polyacrylic acid, polyacrylic esters, polyvinyl acetate, polyacrylonitrile, polyvinyl chloride, and polyvinyl fluoride, the additive polymers of such vinyl compounds, copolymers of vinyl compounds or fluoride type compounds such as polymethacrylic acid, polymethacrylic esters, polyvinylidene chloride, polyvinylidene fluoride, polyvinylidene cyanide, vinylidene fluoride/trifluoroethylene copolymer, vinylidene fluoride/tetrafluoroethylene copolymer, and vinylidene cyanide/vinyl acetate copolymer, fluorine-containing resins such as polytrifluoroethylene, polytetrafluoroethylene, and polyhexafluoropropylene, polyamides such as nylon 6 and nylon 66, polyesters such as polyimide, polyurethane, polypeptide, and polyethylene terephthalate, polyethers such as polycarbonate, polyoxymethylene, polyethylene oxide, and polypropylene oxide, epoxy resins, polyvinyl alcohols, and polyvinyl butyral may be cited, though not exclusively. Resins having a high rigidity and high transparency and possibly taking place of glass, thiourethane type thermosetting resins, and optical resins such as ARTON (produced by Japan Synthetic Rubber Co., Ltd.), ZEONEX (produced by Nippon Zeon Co., Ltd.), OPTPOREZ (produced by Hitachi Kasei Co., Ltd.), and O-PET (produced by Kanebo Ltd.) may be used advantageously.

The method for producing the plasma display grade filter of this invention may slightly vary with the base resin to be used, depending on the working temperature and the conditions for forming a film. Generally, (i) a method which comprises adding the phthalocyanine compound of this invention to a base resin in the form of a powder or pellets, heating and resolving the resultant mixture to a temperature in the range of 150 to 350° C., and forming the resolved mixture in a resin sheet, (ii) a method which comprises forming a film by the use of an extruding machine, and (iii) a method which comprises manufacturing a raw fabric with an extruding machine, uniaxially or biaxially stretching the raw fabric at 30 to 120° C. by two to five times the original length thereby obtaining a film of 10 to 200 $\mu$m in thickness may be cited. Optionally, the kneading may be performed in the presence of such an additive as an ultraviolet absorbent and a plasticizer which has been generally used in the molding of resin. The amount of the phthalocyanine compound of this invention to be added may vary with the thickness of the resin product to be obtained, the intensity of absorption aimed at, and the transmittance to the visible light. Generally, it is in the range of 0.0005 to 20%. Optionally, a resin sheet or a resin film may be made by the casting process which resorts to bulk polymerization of the phthalocyanine compound of this invention and methyl methacrylate, for example.

Then, as typical examples of the method (2) which comprises preparing a coating and applying the coating to a given surface, a method which comprises dissolving the phthalocyanine compound of this invention in a binder resin and an organic solvent thereby preparing a coating, and a method which comprises finely dividing the phthalocyanine compound into minute particles of not more than several $\mu$m in diameter and dispersing the minute particles in an acrylic emulsion thereby preparing a water type coating may be cited. The former method generally uses as the binder resin an aliphatic ester type resin, an acrylic resin, a melamine resin, an urethane resin, an aromatic ester type resin, a polycarbonate resin, an aliphatic polyolefin resin, an aromatic polyolefin resin, a polyvinyl resin, a polyvinyl alcohol resin, a polyvinyl type modified resin (such as PVB and EVA), or a copolymer thereof. Optionally, such optical resins as ARTON (produced by Japan Synthetic Rubber Co., Ltd.), ZEONEX (produced by Nippon Zeon Co., Ltd.), OPTPOREZ (produced by Hitachi Kasei Co., Ltd.), and O-PET (produced by Kanebo Ltd.) may be used. As typical examples of the solvent used herein, halogen type, alcohol type, ketone type, ester type, aliphatic hydrocarbon type, aromatic hydrocarbon type, ether type solvents, and mixtures thereof may be cited.

The concentration of the phthalocyanine compound of this invention may be varied depending on the thickness of the coating, the intensity of the absorption aimed at, and the transmittance to the visible light. Generally, it is in the range of 0.1 to 30%, based on the weight of the binder resin. The binder resin concentration is generally in the range of 1 to 50%, based on the total amount of the coating material. The water type coating of acrylic emulsion may be likewise obtained by finely dividing the phthalocyanine compound of this invention into minute particles (of 950 to 500 nm in diameter) and dispersing the minute particles in an uncolored acrylic emulsion coating. The coating may incorporate therein such additives as an ultraviolet absorbent and an antioxidant which have been generally used in coatings. The coating prepared by the method described above may be applied to a transparent resin film, a transparent resin sheet, or a transparent glass sheet, for example, by the use of a bar coater, a blade coater, a spin coater, a reverse coater, a die coater, or a sprayer, to afford the plasma display grade film of the present invention. The coating surface of the plasma display grade film may be provided with a protective layer or adjoined by a transparent resin sheet or a transparent resin film for the purpose of protection thereof. The cast film may be involved in the method.

In the method (3) which comprises causing an adhesive agent to incorporate therein the phthalocyanine compound to form a laminated resin sheet, a laminated resin film, or a laminated glass sheet, the adhesive agent may be selected among known laminate glass grade transparent adhesive agents such as silicon type, urethane type, and acryl type adhesive agents, polyvinyl butyral adhesive agents (PVA) for resin or laminate glass, and ethylene-vinyl acetate type adhesive agent (EVA) for resin or laminate glass. By using an adhesive agent having the phthalocyanine compound of this invention incorporated therein in an amount in the range of 0.1 to 30% by weight, two transparent resin sheets, a resin sheet and a resin film, a resin sheet and a glass sheet, two resin films, a resin film and a glass sheet, and two glass sheets may be joined to afford a filter. The filter may be otherwise obtained by the method of thermo-compression bonding. The film or sheet which has been manufactured by the method described above, when necessary, may be pasted to a glass sheet or a resin sheet. The thickness of this filter may be varied with the specification of the manufactured plasma display. It is generally in the range of 0.1 to 10 mm. A transparent film containing a UV absorbent (UV cut film) may be applied to the outer surface of the filter for the purpose of imparting enhanced lightfastness thereto.

In this invention, the plasma display grade filter is disposed in front of the display as a filter for preventing an incorrect operation for the purpose of cutting a near infrared ray emanating from the display. The brightness of an image on a display, therefore, is reduced in proportion as the transmittance to the visible ray is lowered. The transmittance of the filter to the visible ray is preferably as high as permissible. It must be at least 60%, preferably not less than 70%. The region of the near infrared ray to be cut is in the range of 750 to 1100 nm, preferably 800 to 1000 nm, which is used for a remote control or a transmission type optical communication. The filter is designed so that the average transmittance to light in this region is not more than 15%, preferably not more than 10%. Two or more kinds of phthalocyanine compounds represented by the formula (1) mentioned above may be used in combination, when necessary for the above design. For the purpose of varying the color tone of the filter, the filter may additionally incorporate therein other dye having absorption in the visible region. It is otherwise permissible to manufacture a filter exclusively containing a dye for color adjustment and then adjoining this filter to the filter of this invention. Where the filter is furnished with an electromagnetic wave cutting layer as by sputtering, the added filter possibly varies the tint of the original filter. The color tone is important in spite of the variation of the tint.

For the purpose of rendering the filter obtained by the method described above more practical, it may be provided with an electromagnetic wave cutting layer, an antireflection (AR) layer, or a non-glare (AG) layer which is capable of shielding the electromagnetic wave emanating from the plasma display. The method for manufacturing such a layer is not subject to any particular restriction. The electromagnetic wave cutting layer, for example, may be obtained by using a sputtering method with a metal oxide. Generally, $In_2O_3$ (ITO) additionally containing Sn has been popularly used as the metal oxide. By alternately superposing a dielectric layer and a metallic layer by sputtering on a substrate, it is made possible to cut a light with a wavelength exceeding 1100 nm and covering a near infrared ray, a far infrared ray, and an electromagnetic wave. The dielectric layer may be formed of a transparent metal oxide such as indium oxide or zinc oxide and the metallic layer may be generally formed of silver or a silver-palladium alloy. Generally, the superposition may start from a dielectric layer and approximately totals three layers, five layers, seven layers, or 11 layers may be formed. In this case, the superposed layers can cut the heat emanating from the display simultaneously. Since the phthalocyanine compound of this invention enjoys excellent effects in shielding a heat ray, the superposed layers may be further added with effects for heat-resistance. As the basis, the filter containing the phthalocyanine compound of this invention may be used in its unmodified form. optionally, the filter containing the phthalocyanine compound may be adjoined to a resin film or a glass sheet after the film or the sheet has been sputtered. When the electromagnetic wave cutting is to be actually carried out, the filter must be provided with a grounding electrode. The antireflection layer, for the purpose of repressing the reflection on the surface and enhancing the transmittance of the filter, may be subjected to a method which comprises superposing such an inorganic substance as metal oxide, fluoride, boride, carbide, nitride, or sulfide in a single layer or a plurality of layers by the vacuum deposition method, sputtering method, ion-plating method, or ion beam-assisting method or to a method which comprises superposing such a resin as an acrylic resin and a fluorine resin having different refractive indexes in a single layer or a plurality of layers, for example. A film which has undergone a treatment for preventing reflection may be adjoined to the filter mentioned above. The filter, when necessary, may be provided with a nonglare (AG) layer. The nonglare (AG) layer, for the purpose of scattering a permeating light with a view to widening the angle of the field of view, may be subjected to a method which comprises preparing an ink of minute particles of silica, melamine, or acryl and coating the surface of the filter with the ink. The ink may be set by means of heat or light. Optionally, the film which has undergone a treatment for preventing glare may be applied to the filter. The filter, when necessary, may be furnished with a hard coat layer.

The construction of the filter for the plasma display may be varied, as occasion demands. Generally, an antireflection layer may be superposed on a filter containing a near infrared ray absorbing compound and, when necessary, a nonglare layer may be disposed on the side opposite the side seating the antireflection layer. When an electromagnetic wave cutting layer is further added to the combination of the layers under discussion, a filter containing a near infrared absorbing compound may be used as a basis, or alternatively, an electromagnetic wave cutting layer may be superposed thereon, or alternatively, a filter containing a near infrared absorbing compound and a filter having an ability to cut a electromagnetic wave may be adjoined to each other. It is further permissible to form anti-reflecting layers on the opposite sides of the filter or, when necessary, to form an antireflection layer on one of the opposite sides and a nonglare layer on the other side. When a dye having absorption in a visible region is added for the color correction, a method to be used for this addition does not need to be particularly restricted. Since the plasma display grade filter of this invention has high transmittance to the visible ray and, therefore, can efficiently cut a near infrared light in the approximate range of 800 to 1000 nm emanating from the display, it has no adverse effects on the wavelengths used by a remote control of an electronic apparatus or a transmission type optical communication apparatus and thus can prevent these apparatuses from producing an incorrect operation.

According to the sixth aspect, the near infrared absorbable material of this invention can absorbs a near infrared ray at a wavelength in the range of 800 to 1000 nm and comprises at least one member selected from the group consisting of the phthalocyanine compounds according to the first aspect of this invention, the phthalocyanine compounds produced by the method according to the second aspect of this invention, and the near infrared absorption dyes according to the third aspect of this invention plus a resin, the amount of the phthalocyanine compound and/or near infrared absorption dye incorporated being in the range of 0.0005 to 20 parts by weight, preferably 0.0010 to 10 parts by weight, based on 100 parts by weight of the resin.

The phthalocyanine compound which can be used in the near infrared absorbable material of this invention may be any of the phthalocyanine compounds represented by the formula (1) mentioned above. Preferably, they are phthalocyanine compounds having vanadium, copper, and zinc as the central metal. Typically, the phthalocyanine compounds which are represented by the abbreviations: $VOPc(2,5-Cl_2PhO)_8\{2,6-(CH_3)_2PhO\}_4\{Ph(CH_3)CHNH\}_3F$, $VOPc(2,5-Cl_2PhO)_8\{2,6-(CH_3)_2PhO\}_4(PhCH_2NH)_4$, $CuPc(2,5-Cl_2PhO)_8\{2,6-(CH_3)_2PhO\}_4(PhCH_2NH)_4$, $CuPc(PhS)_8\{2,6-(CH_3)_2PhO\}_4(PhCH_2NH)_4$, $VOPc(4-CNPhO)_8\{2,6-Br_2-4-(CH_3)PhO\}_4\{Ph(CH_3)CHNH\}_4$ and $ZnPc(2,6-Cl_2PhO)_8\{2,6-Br_2-4-(CH_3)PhO\}_4\{Ph(CH_3)CHNH\}_3F$ may be cited.

The resin which can be used in this invention may be suitably selected, depending on the purpose for which the produced near infrared absorbing material is used. Preferably, the resin is substantially transparent and does not induce absorption and scattering very heavily. As typical examples of the resin fit for the use herein, polycarbonate resins; (meth)acrylic resins such as methyl methacrylate; polystyrenes; polyvinyl chloride; polyvinyl resins such as polyvinylidene chloride; polyolefin resins such as polyethylene and polypropylene; polybutyral resin; vinyl acetate type resins such as polyvinyl acetate; and polyester resins and polyamide resins may be cited. Besides being used singly, these resins may be used in the form of a blend of two or more members so long as the blend be substantially transparent. Optionally, such a resin may be used as interposed between opposed sheets of transparent glass. When the near infrared absorbing material is used as a heat-accumulating and warmth-retaining material, the resin does not need to be transparent. Among other resins mentioned above, polycarbonate resin, (meth)acrylic resin, polyester resin, polystyrene resin and polyvinyl chloride which excel in weatherability and transparency prove advantageous and polycarbonate resin, methacrylic resin, polyethylene terephthalte (PET) resin, and polyvinyl chloride prove particularly advantageous. In the case of the use as a heat-accumulating and warmth-retaining fibers, polyethylene terephthalate resin or polyamide resin prove preferably.

Of these resins, the polycarbonate resin, the acrylic resin, and the vinyl chloride resin are as defined in the fourth aspect mentioned above.

In this aspect, a proper additive suitable for the intended application may be used. As typical examples of the additive fit for the use herein, a coloring agent, a polymerization adjusting agent, an antioxidant, an ultraviolet absorbent, a flame retardant, a plasticizer, a rubber for improving shock resistance, and a peeling agent may be cited.

The phthalocyanine compound of this invention may be used in combination with a known near infrared absorbable material.

Further, in this invention, the method for mixing the phthalocyanine compound with a transparent resin and forming the resultant mixture does not need to be particularly restricted. As typical examples of this method, the extrusion molding, the injection molding, the cast molding, the press molding, the calendar molding, and the cast film forming method may be cited.

It is otherwise permissible to manufacture the near infrared absorbing material by preparing a film containing the phthalocyanine compound and hot-pressing or thermally laminating the film on a transparent resin sheet. Alternatively, the near infrared absorbing material can be obtained in the form of a sheet, a film, fibers, or a paper by preparing a resin ink or a coating containing the phthalocyanine compound and applying the ink or the coating by printing or coating to such a substrate as a transparent resin sheet, a transparent glass sheet, a film, fibers, or a paper.

Since the phthalocyanine compound used in this invention excels in heat resistance as compared with a commercially available infrared absorbent, it can be molded at such an elevated temperature as in the range of 200 to 350° C. which occurs in such a forming method as the injection molding or the extrusion molding using an acrylic type resin, a polycarbonate resin, or a polyethylene terephthalate resin thereby producing a formed article emitting fine sensation of transparency and excelling in ability to absorb a near infrared ray or ability to shield a heat ray. Heat-retaining and heat-accumulating fibers can be obtained by extruding the phthalocyanine compound in conjunction with a polyester resin or a polyamide resin at a temperature in the range of 220 to 350° C. Even when a forming temperature below 220° C. is used, no problem would be occurred.

The near infrared absorbable material of the above aspect does not need to be particularly discriminated on account of shape. Various shapes such as corrugated sheet, spheres, and dome are conceivable in addition to such most common shapes as flat sheet and film.

The phthalocyanine compound to be used in the sixth aspect may have the used amount thereof varied with the transmittance of the sheet or film of the produced near infrared absorbable material set in the visible and near infrared region and the thickness of the material. The amount of the phthalocyanine compound to be used is generally in the range of 0.0005 to 20 parts by weight, preferably 0.0010 to 10 parts by weight, based on 100 parts by weight of the resin. This amount may be varied with the shape of the near infrared absorbable material. In the case of forming a near infrared absorbable material sheet of 3 mm in thickness, for example, the amount may be properly in the range of 0.002 to 0.06 part by weight, preferably 0.003 to 0.02 part by weight, based on 100 parts by weight of the resin. In the case of forming a near infrared absorbable material plate of 10 mm in thickness, for example, the amount may be properly in the range of 0.0005 to 0.02 part by weight, preferably 0.001 to 0.005 part by weight, based on 100 parts by weight of the resin. In the case of forming a near infrared absorbable material film of 10 $\mu$m in thickness, for example, the amount is proper in the range of 0.1 to 20 parts by weight, preferably 0.5 to 10 parts by weight, based on 100 parts by weight of the resin. To indicate the amount of the phthalocyanine compound to be incorporated in the near infrared absorbable material without reference to the thickness thereof, the amount may be properly in the range of 0.01 to 2.0 $g/m^2$, preferably 0.05 to 1.0 $g/m^2$ as the mass in the area projected from above. In this case, if the amount of the phthalocyanine compound to be incorporated is less than 0.01 $g/m^2$, effects of absorbing the near infrared ray would be unduly small. If it exceeds 2.0 $g/m^2$, the produced near infrared absorbable material would prove conspicuously expensive and the amount of the visible ray to permeate the absorbent would possibly become unduly small.

In the case of the product in such an irregular shape as a corrugated plate, the amount of the phthalocyanine compound to be incorporated in the product may well be considered as the mass in an area projected from above. The concentration of the phthalocyanine compound in the produced material may be distributed unevenly so long as the appearance of the material is not impaired by the uneven concentration distribution. Besides being used singly, the phthalocyanine compounds conforming to this invention may be used in the form a mixture of two or more members, as occasion demands. When two such members used in a given mixture have different absorption wavelengths, this mixture possibly brings about improved effects in absorbing the near infrared ray.

When the phthalocyanine compound and carbon black are used in specific amounts, the amount of the phthalocyanine compound so used can be reduced to less than half of the amount the phthalocyanine compound used singly while effects of absorbing the near infrared ray can be kept at the same level as those produced by the single use of the phthalocyanine compound. Further, the effects of absorbing the near infrared ray in this case can be improved as compared with those obtained when the phthalocyanine compound is used in combination with a dye.

Now, this invention will be described more specifically below with reference to working examples.

SYNTHESIS EXAMPLE 1

Synthesis of 3-(2,6-dimethylphenoxy)-4,5-bis(2,5-dichlorophenoxy)-6-fluorophthalonitrile In a four-neck separable flask having an inner volume of 500 ml, 60 g (0.30 mol) of tetrafluorophthalonitrile, 41.8 g (0.72 mol) of potassium fluoride, and 160 ml of acetone were charged. Further, in a dropping funnel attached thereto, 97.8 g (0.60 mol) of 2,5-dichlorophenol and 110 ml of acetone were charged. The 2,5-dichlorophenol/acetone mixed solution was added dropwise from the dropping funnel to the flask over a period of about two hours while kept stirred at −1° C. The stirring was subsequently continued for about two hours. Thereafter, the contents of the flask were stirred overnight, with the reaction temperature thereof slowly raised to room temperature.

Then, to this flask, 36.6 g (0.30 mol) of 2,6-dimethylphenol, 20.9 g (0.36 mol) of potassium fluoride, and 15.0 ml of acetone were charged and the mixture was kept stirred at 40° C. for 10 hours. The reaction solution was cooled and filtered. The filtrate was distilled by a rotary evaporator to expel the acetone and was recrystallized from methanol. The produced crystals were separated by filtration and vacuum dried to afford 144.8 g of 3-(2,6-dimethylphenoxy)-4,5-bis(2,5-dichlorophenoxy)-6-fluorophthalonitrile (yield: 82.1 mol %).

SYNTHESIS EXAMPLE 2

Synthesis of 3-(2,6-dibromo-4-methylphenoxy)-4,5-bis(2,5-dichlorophenoxy)-6-fluorophthalonitrile In a four-neck separable flask having an inner volume of 500 ml, 60 g (0.30 mol) of tetrafluorophthalonitrile, 41.8 g (0.72 mol) of potassium fluoride, and 160 ml of acetone were placed. Further, in a dropping funnel attached thereto, 97.8 g (0.60 mol) of 2,5-dichlorophenol and 110 ml of acetone were placed. The 2,5-dichlorophenol/acetone mixed solution was added dropwise from the dropping funnel to the flask over a period of about two hours while kept stirred at −1° C. The stirring was subsequently continued for about two hours. Thereafter, the contents of the flask were stirred overnight, with the reaction temperature thereof slowly raised to room temperature.

Then, to this flask, 79.8 g (0.30 mol) of 2,6-dibromo-4-methylphenol, 20.9 g (0.36 mol) of potassium fluoride, and 15.0 ml of acetone were charged and the mixture was kept stirred at 40° C. for 10 hours. The reaction solution was cooled and filtered. The filtrate was distilled by a rotary evaporator to expel the acetone and was recrystallized from methanol. The produced crystals were separated by filtration and vacuum dried to afford 176.8 g of 3-(2,6-dibromo-4-methylphenoxy)-4,5-bis(2,5-dichlorophenoxy)-6-fluorophthalonitrile (yield: 80.5 mol %).

SYNTHESIS EXAMPLE 3

Synthesis of 3-(2,6-dimethylphenoxy)-4,5-bis(2,6-dichlorophenoxy)-6-fluorophthalonitrile In a four-neck separable flask having an inner volume of 500 ml, 60 g (0.30 mol) of tetrafluorophthalonitrile, 41.8 g (0.72 mol) of potassium fluoride, and 160 ml of acetone were placed. Further, in a dropping funnel attached thereto, 97.8 g (0.60 mol) of 2,5-dichlorophenol and 110 ml of acetone were placed. The 2,5-dichlorophenol/acetone mixed solution was added dropwise from the dropping funnel to the flask over a period of about two hours while kept stirred at −1° C. The stirring was subsequently continued for about two hours. Thereafter, the contents of the flask were stirred overnight, with the reaction temperature thereof slowly raised to room temperature.

Then, to this flask, 36.6 g (0.30 mol) of 2,6-dimethylphenol, 20.9 g (0.36 mol) of potassium fluoride, and 15.0 ml of acetone were charged and the mixture was kept stirred at 40° C. for 10 hours. The reaction solution was cooled and filtered. The filtrate was distilled by a rotary evaporator to expel the acetone and was recrystallized from methanol. The produced crystals were separated by filtration and vacuum dried to afford 142.5 g of 3-(2,6-dimethylphenoxy)-4,5-bis(2,6-dichlorophenoxy)-6-fluorophthalonitrile (yield: 80.8 mol %).

SYNTHESIS EXAMPLE 4

Synthesis of 3-(2,6-dibutyl-4-methylphenoxy)-4,5-bis(4-cyanophenoxy)-6-fluorophthalonitrile In a four-neck separable flask having an inner volume of 500 ml, 60 g (0.30 mol) of tetrafluorophthalonitrile, 41.8 g (0.72 mol) of potassium fluoride, and 160 ml of acetone. Further, to a dropping funnel attached thereto, 71.5 g (0.60 mol) of 4-cyanophenol and 110 ml of acetone were placed. The 4-cyalophenol/acetone mixed solution was added dropwise from the dropping funnel to the flask over a period of about two hours while kept stirred at −1° C. The stirring was subsequently continued for about two hours. Thereafter, the contents of the flask were stirred overnight, with the reaction temperature thereof slowly raised to room temperature.

Then, to this flask, 79.8 g (0.30 mol) of 2,6-dibutyl-4-methylphenol, 20.9 g (0.36 mol) of potassium fluoride, and 15.0 mol of acetone were charged and the mixture was kept stirred at 40° C. for 10 hours. The reaction solution was cooled and filtered. The filtrate was distilled by a rotary evaporator to expel the acetone and was recrystallized from methanol. The produced crystals were separated by filtration and vacuum dried to afford 151.3 g of 3-(2,6-dibutyl-4-methylphenoxy)-4,5-bis(4-cyanophenoxy)-6-fluorophthalonitrile (yield: 78.3 mol %).

SYNTHESIS EXAMPLE 5

Synthesis of 3-(2,6-dimethylphenoxy)-4,5-bis(4-cyanophenoxy)-6-fluorophthalonitrile In a four-neck separable flask having an inner volume of 500 ml, 60 g (0.30 mol) of tetrafluorophthalonitrile, 41.8 g (0.72 mol) of potassium fluoride, and 160 ml of acetone. Further, in a dropping funnel attached thereto, 71.5 g (0.60 mol) of 4-cyanophenol and 110 ml of acetone were placed. The 4-cyalophenol/acetone mixed solution was added dropwise from the dropping funnel to the flask over a period of about two hours while kept stirred at −1° C. The stirring was subsequently continued for about two hours. Thereafter, the contents of the flask were stirred overnight, with the reaction temperature thereof slowly raised to room temperature.

Then, to this flask, 36.7 g (0.30 mol) of 2,6-dimethylphenol, 20.9 g (0.36 mol) of potassium fluoride, and 15.0 ml of acetone were charged and the mixture was kept stirred at 40° C. for 10 hours. The reaction solution was cooled and filtered. The filtrate was distilled by a rotary evaporator to expel the acetone and was recrystallized from methanol. The produced crystals were separated by filtration and vacuum dried to afford 116.3 g of 3-(2,6-dimethylphenoxy)-4,5-bis(4-cyanophenoxy)-6-fluorophthalonitrile (yield: 77.5 mol %).

SYNTHESIS EXAMPLE 6

Synthesis of 3-(2,6-dimethylphenoxy)-4,5-bis(phenylthio)-6-fluorophthalonitrile

In a four-neck separable flask having an inner volume of 500 ml, 60 g (0.30 mol) of tetrafluorophthalonitrile, 41.8 g (0.72 mol) of potassium fluoride, and 160 ml of acetone were placed. Further, in a dropping funnel attached thereto, 33.0 g (0.60 mol) of thiophenol was charged. The thiophenol from the dropping funnel was added dropwise from the dropping funnel while kept stirred, with the speed of dropping adjusted so as to keep the reaction temperature of not more than 40° C. and the stirring was subsequently continued for about two hours.

Then, to this flask, 40.3 g (0.33 mol) of 2,6-dimethylphenol, 20.9 g (0.36 mol) of potassium fluoride, and 40 ml of acetonitrile were charged. The mixture was kept stirred under reflux for 8 hours. The reaction solution was cooled and filtered. The filtrate was washed with 600 ml of acetonitrile and filtered. The combined filtrate was distilled by a rotary evaporator to expel the acetonitrile and was recrystallized from methanol. The produced crystals were separated by filtration and vacuum dried to afford 113.8 g of 3-(2,6-dimethylphenoxy)-4,5-bis(phenylthio)-6-fluorophthalonitrile (yield: 78.6 mol %).

EXAMPLE 1

Synthesis of VOPc(2,5-Cl$_2$PhO)$_8$(2,6-Br$_2$-4-CH$_3$PhO)$_4$ {Ph(CH$_3$)CHNH}$_3$F In a four-neck flask having an inner volume of 300 ml, 1.15 g (7.68 millimoles) of divanadium trioxide, 2.92 g (15.4 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. 30 g (41.0 millimoles) of 3-(2,6-dibromo-4-methylphenoxy)-4,5-bis(2,5-dichlorophenoxy)-6-fluorophthalonitrile which was synthesized in the same manner as in Synthesis Example 2 was additionally added thereto, and left standing in an atmosphere of nitrogen at the refluxing temperature for four hours. The reaction mixture was then cooled and placed in an atmosphere of air. 10.0 g (82.5 millimoles) of D,L-1-phenylethyl amine and 165 ml of benzonitrile were added thereto, and then left standing at 60° C. for six hours followed by at 70° C. for two hours. The produced reaction solution was cooled and filtered. The filtrate was dropped into a mixed solution of isopropyl alcohol and water to be separated in crystals and was further washed with a mixed solution of isopropyl alcohol and water. The crystals consequently obtained were vacuum dried to afford 25.14 g of VOPc(2,5-Cl$_2$PhO)$_8$(2,6-Br$_2$-4-CH$_3$PhO)$_4${Ph(CH$_3$)CHNH}$_3$F {yield relative to 3-(2,6-dibromo-4-methylphenoxy)-4,5-bis(2,5-dichlorophenoxy)-6-fluorophthalonitrile: 74.4 mol %}.

| Elementary Anaylsis | C (%) | H (%) | N (%) | Br (%) | Cl (%) | F (%) |
|---|---|---|---|---|---|---|
| Calculated | 48.07 | 2.26 | 4.67 | 19.38 | 17.20 | 0.58 |
| Found | 48.52 | 2.30 | 4.71 | 18.95 | 17.00 | 0.57 |

By the use of a spectrophotometer (Shimadzu Seisakusho Ltd., UV-3100), the phthalocyanine compound obtained in this example [VOPc(2,5-Cl$_2$PhO)$_8$(2,6-Br$_2$-4-CH$_3$PhO)$_4${Ph(CH$_3$)CHNH}$_3$F] was tested for the maximum absorption wavelength and the absorptivity coefficient in toluene.

In a quartz cell of 1 cm, this phthalocyanine compound was diluted with chloroform until the lowest value of the transmittance at 750 to 1050 nm reached a level in the range of 5 to 6%. The transmittance thus reached was measured with a spectrophotometer and the transmittance to the visible ray was computed in accordance with the specification of JIS (Japanese Industrial Standard) R3106 (1985) with the necessary modifications.

At a room temperature (25° C.), the phthalocyanine compound was gradually dissolved in each the solutions of toluene and methylethyl ketone (MEK) (each 10 ml in volume). The solutions in the process of dissolving the compound were visually examined to find the finally dissolved amounts of the compound, i.e. the concentrations (solubility) of the phthalocyanine compound as a solute in the saturated solutions.

The results of the test are shown in Table 1 below. The data of solubility given in Table 1 were obtained from the evaluation performed on a four-point scale as following: ⊙ represents a solubility of not less than 5% by weight, ○ represents a solubility of not less than 1% by weight and less than 5% by weight, Δ represents a solubility of not less than 0.1% by weight and less than 1% by weight, and X represents a solubility of less than 0.1% by weight.

EXAMPLE 2

Synthesis of $VOPc(2,5-Cl_2PhO)_8(2,6-Br_2-4-CH_3PhO)_4\{PhCH_2NH\}_3F$

In a four-neck flask having an inner volume of 300 ml, 1.15 g (7.68 millimoles) of divanadium trioxide, 2.92 g (15.4 millimoles) of p-toluenesulfonic acid monohydrate, and 60 ml of benzonitrile were charged. Then, the mixture was kept stirred at 170° C. for about three hours. The stirred mixture was subsequently heated to the refluxing temperature. 30 g (41.0 millimoles) of 3-(2,6-dibromo-4-methylphenoxy)-4,5-bis(2,5-dichlorophenoxy)-6-fluorophthalonitrile which was synthesized in the same manner as in Synthesis Example 2 was additionally added thereto, and left standing in an atmosphere of nitrogen at the refluxing temperature for four hours. The reaction mixture was then cooled and placed in an atmosphere of air. 8.87 g (82.8 millimoles) of benzyl amine and 167 ml of benzonitrile were added thereto, and then left standing at 60° C. for three hours. The produced reaction solution was cooled and filtered. The filtrate was dropped into a mixed solution of isopropyl alcohol and water to be separated in crystals and was further washed with a mixed solution of isopropyl alcohol and water. The crystals consequently obtained were vacuum dried to afford 24.21 g of $VOPc(2,5-Cl_2PhO)_8(2,6-Br_2-4-CH_3PhO)_4\{PhCH_2NH\}_3F$ {yield relative to 3-(2,6-dibromo-4-methylphenoxy)-4,5-bis(2,5-dichlorophenoxy)-6-fluorophthalonitrile: 73.1 mol %}.

| Elementary Analysis | C (%) | H (%) | N (%) | Br (%) | Cl (%) | F (%) |
| --- | --- | --- | --- | --- | --- | --- |
| Calculated | 47.19 | 2.12 | 4.77 | 19.78 | 17.55 | 0.59 |
| Found | 47.23 | 2.13 | 4.81 | 19.55 | 17.42 | 0.61 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 3

Synthesis of $VOPc(2,5-Cl_2PhO)_8(2,6-(CH_3)_2PhO)_4\{Ph(CH_3)CHNH\}_3F$

In a four-neck flask having an inner volume of 300 ml, 1.43 g (9.53 millimoles) of divanadium trioxide, 3.64 g (19.1 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. Then, 30 g (51.0 millimoles) of 3-(2,6-dimethylphenoxy)-4,5-bis(2,5-dichlorophenoxy)-6-fluorophthalonitrile which was synthesized in the same manner as in Synthesis Example 1 was additionally added thereto, and left standing in an atmosphere of nitrogen at the refluxing temperature for four hours. The reaction mixture was then cooled and placed in an atmosphere of air. Then, 12.4 g (102.3 millimoles) of D,L-1-phenylethyl amine and 163 ml of benzonitrile were added thereto, and then left standing at 60° C. for six hours followed by at 70° C. for two hours. The produced reaction solution was cooled and filtered. The filtrate was dropped into a mixed solution of isopropyl alcohol and water to be separated in crystals and was further washed with a mixed solution of isopropyl alcohol and water. The crystals consequently obtained were vacuum dried to afford 24.49 g of $VOPc(2,5-Cl_2PhO)_8(2,6-(CH_3)_2PhO)_4\{Ph(CH_3)CHNH\}_3F$ {yield relative to 3-(2,6-dimethylphenoxy)-4,5-bis(2,5-dichlorophenoxy)-6-fluorophthalonitrile: 70.5 mol %}.

| Elementary Analysis | C (%) | H (%) | N (%) | Cl (%) | F (%) |
| --- | --- | --- | --- | --- | --- |
| Calculated | 59.98 | 3.33 | 5.66 | 20.83 | 0.70 |
| Found | 60.00 | 3.35 | 5.68 | 20.56 | 0.71 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 4

Synthesis of $VOPc(2,6-Cl_2PhO)_8(2,6-(CH_3)_2PhO)_4\{Ph(CH_3)CHNH\}_3F$

In a four-neck flask having an inner volume of 300 ml, 1.43 g (9.53 millimoles) of divanadium trioxide, 3.64 g (19.1 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. Further, 30 g (51.0 millimoles) of 3-(2,6-dimethylphenoxy)-4,5-bis(2,6-dichlorophenoxy)-6-fluorophthalonitrile which was synthesized in the same manner as in Synthesis Example 3 was additionally-added thereto, and left standing in an atmosphere of nitrogen at the refluxing temperature for four hours. The reaction mixture was then cooled and placed in an atmosphere of air. Then, 12.4 g (102.3 millimoles) of D,L-1-phenylethyl amine and 163 ml of benzonitrile were added thereto, and then left standing at 60° C. for six hours followed by at 70° C. for two hours. The produced reaction solution was cooled and filtered. The filtrate was dropped into a mixed solution of isopropyl alcohol and water to be separated in crystals and was further washed with a mixed solution of sopropyl alcohol and water. The crystals consequently obtained were vacuum dried to afford 26.47 g of $OPc(2,6-Cl_2PhO)_8(2,6-(CH_3)_2PhO)_4\{Ph(CH_3)CHNH\}_3F$ {yield relative to 3-(2,6-dimethylphenoxy)-4,5-bis(2,6-dichlorophenoxy)-6-fluorophthalonitrile: 76.2 mol %}.

| Elementary Analysis | C (%) | H (%) | N (%) | Cl (%) | F (%) |
|---|---|---|---|---|---|
| Calculated | 59.98 | 3.33 | 5.66 | 20.83 | 0.70 |
| Found | 59.99 | 3.32 | 5.66 | 20.78 | 0.69 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 5

Synthesis of VOPc(4-CNPhO)$_8$(2,6-Br$_2$-4-CH$_3$PhO)$_4$ {Ph(CH$_3$)CHNH}$_3$F In a four-neck flask having an inner volume of 300 ml, 1.31 g (8.73 millimoles) of divanadium trioxide, 3.32 g (17.5 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. Further, 30 g (46.6 millimoles) of 3-(2,6-dibromo-4-methylphenoxy)-4,5-bis(4-cyanophenoxy)-6-fluorophthalonitrile which was synthesized in the same manner as in Synthesis Example 5 was additionally added thereto, and left standing in an atmosphere of nitrogen at the refluxing temperature for four hours. The reaction mixture was then cooled and placed in an atmosphere of air. Then, 11.4 g (94.1 millimoles) of D,L-1-phenylethyl amine and 164 ml of benzonitrile were added thereto, and then left standing at 60° C. for five hours followed by at 70° C. for three hours. The produced reaction solution was cooled and filtered. The filtrate was dropped into a mixed solution of isopropyl alcohol and water to be separated in crystals and was further washed with a mixed solution of isopropyl alcohol and water. The crystals consequently obtained were vacuum dried to afford 26.90 g of VOPc(4-CNPhO)$_8$(2,6-Br$_2$-4-CH$_3$PhO)$_4$[Ph(CH$_3$)CHNH}$_3$F {yield relative to 3-(2,6-dibromo-4-methylphenoxy)-4,5-bis(4-cyanophenoxy)-6-fluorophthalonitrile: 78.4 mol %}.

| Elementary Analysis | C (%) | H (%) | N (%) | Br (%) | F (%) |
|---|---|---|---|---|---|
| Calculated | 57.05 | 2.80 | 9.03 | 21.69 | 0.64 |
| Found | 57.11 | 2.81 | 9.07 | 21.66 | 0.65 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 6

Synthesis of VOPc(4-CNPhO)$_8$(2,6-(CH$_3$)$_2$PhO)$_4$[Ph(CH$_3$)CHNH}$_3$F

In a four-neck flask having an inner volume of 300 ml, 1.68 g (11.2 millimoles) of divanadium trioxide, 4.28 g (22.5 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. Further, 30 g (59.9 millimoles) of 3-(2,6-dimethylphenoxy)-4,5-bis(4-cyanophenoxy)-6-fluorophthalonitrile which was synthesized in the same manner as in Example Synthesis 4 as additionally added thereto, and left standing in an atmosphere of nitrogen at the refluxing temperature for four hours. The reaction mixture was then cooled and placed in an atmosphere of air. Then, 14.53 g (119.9 millimoles) of D,L-1-phenylethyl amine and 161 ml of benzonitrile were added thereto, and then left standing at 60° C. for five hours followed by at 70° C. for three hours. The produced reaction solution was cooled and filtered. The filtrate was dropped into a mixed solution of isopropyl alcohol and water to be separated in crystals and was further washed with a mixed solution of isopropyl alcohol and water. The crystals consequently obtained were vacuum dried to afford 27.37 g of VOPc(4-CNPhO)$_8$(2,6-(CH$_3$)$_2$PhO)$_4$[Ph(CH$_3$)CHNH}$_3$F {yield relative to 3-(2,6-dimethylphenoxy)-4,5-bis(4-cyanophenoxy)-6-fluorophthalonitrile: 77.0 mol %}.

| Elementary Analysis | C (%) | H (%) | N (%) | F (%) |
|---|---|---|---|---|
| Calculated | 72.90 | 4.16 | 11.22 | 0.80 |
| Found | 72.92 | 4.16 | 11.23 | 0.79 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 7

Synthesis of VOPc(2,5-Cl$_2$PhO)$_8$(2,6-(CH$_3$)$_2$PhO)$_4$(PhCH$_2$NH)$_4$

In a four-neck flask having an inner volume of 300 ml, 1.24 g (8.29 millimoles) of divanadium trioxide, 3.15 g (16.6 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. Further, 30 g (51.0 millimoles) of 3-(2,6-dimethylphenoxy)-4,5-bis(2,5-dichlorophenoxy)-6-fluorophthalonitrile which was synthesized in the same manner as in Synthesis Example 1 was additionally added thereto, and left standing in an atmosphere of nitrogen at the refluxing temperature for ten hours. The reaction mixture was then cooled and placed in an atmosphere of air. Then, 43.7 g (408.0 millimoles) of PhCH$_2$NH$_2$, 2.81 g (28.0 millimoles) of calcium carbonate, and 33 ml of benzonitrile were added thereto, and then left standing at 60° C. for seven hours. The produced reaction solution was cooled and filtered. The filtrate was dropped into a mixed solution of acetone and water to be separated in crystals and was further washed with a mixed solution of acetone and water. The crystals consequently obtained were vacuum dried to afford 23.2 g of VOPc(2,5-Cl$_2$PhO)$_8$(2,6-(CH$_3$)$_2$PhO)$_4$(PhCH$_2$NH)$_4${yield relative to 3-(2,6-dimethylphenoxy)-4,5-bis(2,5-dichlorophenoxy)-6-fluorophthalonitrile: 65.8 mol %}.

| Elementary Analysis | C (%) | H (%) | N (%) | Cl (%) |
|---|---|---|---|---|
| Calculated | 60.74 | 3.35 | 6.07 | 20.49 |
| Found | 60.70 | 3.32 | 6.01 | 20.50 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 8

Synthesis of $CuPc(2,5-Cl_2PhO)_8(2,6-(CH_3)_2PhO)_4(PhCH_2NH)_4$

In a four-neck flask having an inner volume of 300 ml, 30 g (51.0 millimoles) of 3-(2,6-dimethylphenoxy)-4,5-bis(2,5-diclorophenoxy)-6-fluorophthalonitrile which was synthesized in the same manner as in Synthesis Example 1, 1.52 g (15.3 millimoles) of copper chloride, and 45 ml of n-octanol were placed. Then, the mixture was kept stirred with bubbled with nitrogen at 170° C. for about four hours. The mixture was subsequently placed under an atmosphere of air. Then, 21.9 g (204.0 millimoles) of $PhCH_2NH_2$ and 180 ml of benzonitrile were added thereto and left standing at 90° C. for five hours. The produced reaction solution was cooled and filtered. The filtrate was dropped into a mixed solution of acetonitrile and water to be separated in crystals and was further washed with a mixed solution of acetonitrile and water. The crystals consequently obtained were vacuum dried to afford 22.6 g of $CuPc(2,5-Cl_2PhO)_8(2,6-(CH_3)_2PhO)_4(PhCH_2NH)_4$ {yield relative to 3-(2,6-dimethylphenoxy)-4,5-bis(2,5-diclorophenoxy)-6-fluorophthalonitrile: 64.2 mol %}.

| Elementary Analysis | C (%) | H (%) | N (%) | Cl (%) |
|---|---|---|---|---|
| Calculated | 60.81 | 3.35 | 6.08 | 20.51 |
| Found | 60.83 | 3.38 | 6.11 | 20.50 |

The phthalocyanine compound thus obtained was tested for the maximum absorption wavelength, absorptivity coefficient, transmittance to visible ray, and solubility in the same manner as in Example 1. The results are shown in Table 1 below.

EXAMPLE 9

Synthesis of $VOPc(PhS)_8(2,6-(CH_3)_2PhO)_4(PhCH_2NH)_4$

In a four-neck flask having an inner volume of 300 ml, 1.24 g (8.29 millimoles) of divanadium trioxide, 3.15 g (16.6 millimoles) of p-toluenesulfonic acid monohydrate, and 60 ml of benzonitrile were placed. Then, the mixture was kept stirred at 170° C. for about three hours. The stirred mixture was subsequently heated to the refluxing temperature. Further, 30 g (62.2 millimoles) of 3-(2,6-dimethylphenoxy)-4,5-bis(phenylthio)-6-fluorophthalonitrile which was synthesized in the same manner as in Synthesis Example 6 was additionally added thereto, and left standing in an atmosphere of nitrogen at the refluxing temperature for 20 hours. The reaction mixture was then cooled and placed in an atmosphere of air. Then, 100 ml of $PhCH_2NH_2$ was added thereto, and left standing under an atmosphere of air at 100° C. for seven hours. The produced reaction solution was cooled and filtered. The filtrate was dropped into a mixed solution of acetonitrile and water to be separated in crystals and was further washed with a mixed solution of acetonitrile and water. The crystals consequently obtained were vacuum dried to afford 18.3 g of $VOPc(PhS)_8(2,6-(CH_3)_2PhO)_4(PhCH_2NH)_4$ {yield relative to 3-(2,6-dimethylphenoxy)-4,5-bis(phenylthio)-6-fluorophthalonitrile: 61.3 mol %}.

| Elementary Analysis | C (%) | H (%) | N (%) | S (%) |
|---|---|---|---|---|
| Calculated | 71.68 | 4.64 | 7.16 | 10.93 |
| Found | 71.70 | 4.65 | 7.16 | 10.88 |

The phthalocyanine compound thus obtained was tested for the maximum absorption wavelength, absorptivity coefficient, transmittance to visible ray, and solubility in the same manner as in Example 1. The results are shown in Table 1 below.

CONTROL 1

Synthesis of $VOPc(PhNH)_8(PhS)_8$

In a four-neck flask having an inner volume of 100 ml, 4.52 g (41.0 millimoles) of thiophenol, 2.30 g (41.0 millimoles) of potassium hydroxide, and 50 ml of pyridine were placed and left reacting at 80° C. for one hour. The resultant reaction mixture and 4.94 g (3.4 millimoles) of $VOPc(PhNH)_8F_8$ added thereto which was synthesized in the same manner as in Control 2 below were left reacting under refluxing conditions for four hours. After the reaction, the resultant reaction mixture was distilled to expel the pyridine. The solids remaining after the distillation was washed with methanol to afford 6.17 g of $VOPc(PhNH)_8(PhS)_8$ as a dark green cake (yield: 83.5%).

The phthalocyanine compound thus obtained was tested for the maximum absorption wavelength, absorptivity coefficient, transmittance to visible ray, and solubility in the same manner as in Example 1. The results are shown in Table 1 below.

CONTROL 2

Synthesis of $VOPc(PhNH)_8F_8$

In a four-neck flask having an inner volume of 100 ml, 5.19 g (6 millimoles) of hexadecafluoro oxyvanadium phthalocyanine and 26.82 g (288 millimoles) of aniline were placed and left reacting at the refluxing temperature for four hours. After the reaction was completed, the reaction mixture was filtered to separate insoluble portions. The filtrate was distilled to expel the aniline. The solids remaining after the distillation was washed with 300 ml of n-hexane to afford 6.72 g of octafluoro-octakisanilino oxyvanadium phthalocyanine [$VOPc(PhNH)_8F_8$] as a black cake (yield: 77.1%).

The phthalocyanine compound thus obtained was tested for the maximum absorption wavelength, absorptivity coefficient, transmittance to visible ray, and solubility in the same manner as in Example 1. The results are shown in Table 1 below.

CONTROL 3

By following the procedure disclosed in Example 3 of JP-A-07-70,129, penta(4-methoxyphenylamino)deca(4- methylphenylthio) copper phthalocyanine was synthesized. Briefly stated, pentadeca(4-methylphenylthio) copper phthalocyanine (2.41 parts by weight) and 4-anisidine (25.0 parts by weight) were mixed together and heated at 160 to 180° C. for 18 hours. Then, the resultant reaction mixture was cooled to 80 to 85° C. and then, in conjunction with ethanol 740P (70 cm³) added thereto, filtered to separate the product. The product was washed with ethanol 740P (200 cm³) until it became nearly colorless. The residue was boiled in ethanol (100 cm³), filtered, and washed with hot ethanol (30 cm³), to remove the remaining 4-anisidine. By repeating this procedure, a black powder. containing virtually no 4-anisidine was obtained (melting point: 185° C., λmax(in $CH_2Cl_2$): 860 cm⁻¹).

The phthalocyanine compound thus obtained was tested for the maximum absorption wavelength, absorptivity

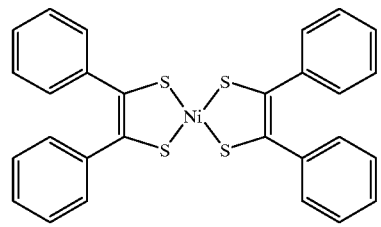

was tested for the solubility and transmittance to the visible ray in the same manner as in Example 1. The results are shown in Table 1 below.

TABLE 1

| | Abbreviation of Phthalocyanine Compound | Maximum Absorption Wavelength (Absorptivity Coefficient ε) | Solubility Toluene | MEK | Transmittance to Visible Ray (%) |
|---|---|---|---|---|---|
| Example 1 | VOPc(2,5-$Cl_2$PhO)₈(2,6-$Br_2$-4-$CH_3$PhO)₄{Ph($CH_3$)CHNH}₃F | 835 nm (76000) | ⊙ | ⊙ | 79 |
| Example 2 | VOPc(2,5-$Cl_2$PhO)₈(2,6-$Br_2$-4-$CH_3$PhO)₄(PhCH₂NH)₃F | 840 nm (68000) | ⊙ | ⊙ | 81 |
| Example 3 | VOPc(2,5-$Cl_2$PhO)₈(2,6-($CH_3$)₂Pho)₄{Ph($CH_3$)CHNH}₃F | 834 nm (84000) | ⊙ | ⊙ | 82 |
| Example 4 | VOPc(2,6-$Cl_2$PhO)₈(2,6-($CH_3$)₂PhO)₄{Ph($CH_3$)CHNH}₃F | 835 nm (92000) | ⊙ | ⊙ | 83 |
| Example 5 | VOPc(4-CNPhO)₈(2,6-$Br_2$-4-$CH_3$Pho)₄{Ph($CH_3$)CHNH}₃F | 836 nm (72000) | ⊙ | ⊙ | 80 |
| Example 6 | VOPc(4-CNPhO)₈(2,6-($CH_3$)₂Pho)₄{Ph($CH_3$)CHNH}₃F | 834 nm (83000) | ⊙ | ⊙ | 81 |
| Example 7 | VOPc(2,5-$Cl_2$PhO)₈(2,6-($CH_3$)₂Pho)₄(PhCH₂NH)₄ | 880 nm (128200) | ⊙ | ⊙ | 83 |
| Example 8 | CuPc(2,5-$Cl_2$PhO)₈(2,6-($CH_3$)₂Pho)₄(PhCH₂NH)₄ | 810 nm (154000) | ⊙ | ⊙ | 85 |
| Example 9 | VOPc(PhS)₈(2,6-($CH_3$)₂Pho)₄{PhCH₂NH}₄ | 920 nm (130800) | ⊙ | ⊙ | 79 |
| Control 1 | VOPc(PhNH)₈(PhS)₈ | 950 nm (—) | ⊙ | ⊙ | 50 |
| Control 2 | VOPc(PhNH)₈F₈ | 860 nm (—) | ⊙ | ⊙ | 48 |
| Control 3 | Penta(4-methoxyphenylamino)deca(4-methylphenylthio) copper phthalocyanine | 849 nm (—) | ⊙ | ○ | 61 |
| Control 4 | | 856 nm (—) | X | X | 77 | coefficient, transmittance to visible ray, and solubility in the same manner as in Example 1. The results are shown in Table 1 below.

CONTROL 4

The following compound disclosed in Example 1 of JP-A-09-230,134:

It is noted from Table 1 that the phthalocyanine compounds of Examples 1 to 9 of this invention were more excellent in transparency as well as being capable of absorbing a near infrared ray at 750 to 1100 nm and a heat ray to degrees equal to or higher than those of Controls 1 to 3, without lowering the transmittance to a visible ray as compared with the compounds of Controls 1 to 3. Further, form the comparison between the phthalocyanine compounds of Examples 1 to 9 of this invention and the compound of Control 4 in terms of solubility, significant differences in solubility are found, indicating that the phthalocyanine compounds of this invention are characterized by exhibiting very high degrees of solubility and possessing very high degrees of compatibility with a resin.

EXAMPLE 10

By the use of an injection molding press adjusted in advance to temperatures of 250 to 300° C., 100 parts by weight of a molten polycarbonate resin (Teijin Chemicals, Ltd., Panlite 1285) and 0.012 part by weight of the phthalocyanine compound [$VOPc(2,5-Cl_2PhO)_8(2,6-(CH_3)_2 PhO)_4\{Ph(CH_3)CHNH\}_3F$] obtained in Example 3 were jointly injection molded into a lens of 75 mm in outside diameter and 2 mm in center thickness.

The transmittance to the light ray of 850 nm at the center of the produced lens was 9.0% and the transmittance to the visible ray was 79%.

When an operator wore this lens and proceeded to use a laser cutter, he felt neither stimulation nor sensation of fatigue in his eyes and encountered no hindrance of any sort in the recognition of an object in the field of view.

EXAMPLE 11

By the use of an injection molding press adjusted in advance to temperatures of 250 to 300° C., 100 parts by weight of a molten polycarbonate resin (Teijin Chemicals, Ltd., Panlite 1285) and 0.010 part by mass of a phthalocyanine compound [$CuPc(2,5-Cl_2PhO)_8(2,6-(CH_3)_2PhO)_4\{Ph(CH_3)CHNH\}_4$] obtained in Example 8 were jointly injection molded into a lens of 75 mm in outside diameter and 2 mm in center thickness.

The transmittance to the light ray of 850 nm at the center of the produced lens was 9.0% and the transmittance to the visible ray was 83%.

When an operator wore this lens and proceeded to use a laser cutter, he felt neither stimulation nor sensation of fatigue in his eyes and encountered no hindrance of any sort in the recognition of an object in the field of view.

EXAMPLE 12

By the use of a T-die extruding device, 100 parts by weight of a molten polycarbonate resin (Teijin Chemicals, Ltd., Panlite 1285) and 0.0100 part by weight of the phthalocyanine compound [$VOPc(2,5-Cl_2PhO)_8(2,6-(CH_3)_2 PhO)_4\{Ph(CH_3)CHNH\}_3F$] obtained in Example 3 were jointly extrusion molded at 280° C. into a sheet of 2.5 mm in thickness to obtain a filter.

The minimum value of the transmittance to the light ray of 750 to 1,100 nm of the produced lens was 6.0% and the transmittance to the visible ray was 76%.

This filter was actually mounted on the front face part of a plasma display. When an electronic device operated by means of a remote control unit was installed at a position of 2.5 m from the display and trially operated to determine whether or not the electronic device was induced to produce an incorrect operation. It was found that an incorrect operation was induced in the absence of the filter and was not induced in the case of using the filter.

EXAMPLE 13

A filter was obtained by following the procedure of Example 12 while changing the phthalocyanine compound of Example 12 to 0.0080 part by weight of the phthalocyanine compound $\{CuPc(2,5-Cl_2PhO)_8(2,6-(CH_3)_2-PhO)_4\{PhCH_2NH\}_4\}$ obtained in Example 8. The minimum value of the transmittance to the light ray of 750 to 1,100 nm of the produced lens was 5.4% and the transmittance to the visible ray was 81%.

This filter was tested by following the procedure of Example 12 to determine whether or not it allowed the occurrence of an incorrect operation. Absolutely no incorrect operation was induced when the filter was disposed on the display.

EXAMPLE 14

By the use of an extruding press and a film producing device, 100 parts by weight of a molten polyethylene terephthalate resin and 0.120 part by weight of the phthalocyanine compound $\{VOPc(2,5-Cl_2PhO)_8(2,6-(CH_3)_2-PhO)_4\{PhCH_2NH\}_4\}$ obtained in Example 7 added thereto were jointly extrusion molded at a forming temperature of 280° C. to obtain a filter film of 0.1 mm in thickness. The average transmittance of the produced filter film to light at 800 to 950 nm was 5.7% and the transmittance to a visible ray was 80%.

When this filter film was actually mounted on the front face of a plasma display and tested in the same manner as in Example 12 to determine whether or not it prevented the display from inducing an incorrect operation. Absolutely no induction of an incorrect operation was observed when the filter film was mounted on the display.

EXAMPLES 15 and 16

As illustrated in FIG. 1, a temperature measuring device 6 was constructed by disposing support posts 3 perpendicularly (in the direction of incidence of the direct sunlight) to a support base 2 adjusted to form a substantially right angle relative to direct sunlight 1, setting a measuring filter 4 at the leading ends of the support posts 3, and disposing a sample supporting plate 5 adjustable in the vertical direction in the proximity to the lower parts of the support posts 3 (such that the device was prevented from accumulating heat by the use of a panel for the measurement which was pervious to a current of air). A black panel 7 was set on the sample supporting plate 5, with a distance of 200 mm interposed between the surface of the black panel 7 and the lower side of the measuring filter 4, and a temperature sensor 8 was contacted with the surface of the black panel 7. This temperature sensor 8 was connected via a conductor wire 9 to a measuring device (not shown). By using this temperature measuring device 6, parts exposed to the beams of direct sunlight passing through the filters of Example 12 and Example 13 were measured for temperature. The filters were subjected to 100 hours' light resistance test under the conditions of 50% of humidity, 63° C. of black panel temperature, and 90 mW/cm² of intensity of ultraviolet light. The results are shown in Table 2 below.

CONTROL 5

A polycarbonate sheet of 2.5 mm in thickness was obtained by molding a fused polycarbonate resin (Teijin Chemicals, Ltd., Panlite 1285) with a T-die extruding device at 280° C. The produced sheet was tested for the temperature and light resistance in the same manner as in Example 15 and Example 16. The results are shown in Table 2 below.

CONTROLS 6 and 7

Filters were obtained by adding the phthalocyanine compounds (abbreviations; $VOPc(BuNH)_8(BuS)_8$ (Control 1)

and VOPc(PhNH)$_8$F$_8$ (Control 2)} in the amounts indicated in Table 2 respectively to 100 parts by weight of a fused polycarbonate resin (Teijin Chemicals, Ltd., Panlite 1285) and molding the resultant mixtures with a T-die extruding device at 280° C. into sheets of 2.5 mm in thickness. The produced filters were tested for the transmittance to a visible ray. The results are shown in Table 2 below.

The filters were also tested for the temperature and light resistance in the same manner as in Example 15 and Example 16. The results are shown in Table 2 below.

TABLE 2

|  | Abbreviation of phthalocyanine compound | Amount added (parts by weight) | Temperature of black panel (° C.) | Transmittance to visible ray (%) | Light resistance (ΔE) |
| --- | --- | --- | --- | --- | --- |
| Example 15 | VOPc(2,5-Cl$_2$PhO)$_8$(2,6-(CH$_3$)$_2$PhO)$_4$ {Ph(CH$_3$)CHNH}$_3$F | 0.0100 | 32.9 | 76 | 0.2 |
| Example 16 | CuPc(2,5-Cl$_2$PhO)$_8$(2,6-(CH$_3$)$_2$PhO)$_4$ {PhCH$_2$NH}$_4$ | 0.0080 | 33.4 | 81 | 0.2 |
| Control 5 | — | No Addition | 43.5 | 96 | 0.4 |
| Control 6 | VOPc(BuNH)$_8$(BuS)$_8$ | 0.0070 | 39.5 | 60 | 0.3 |
| Control 7 | VOPc(PhNH)$_8$F$_8$ | 0.0074 | 41.5 | 55 | 0.3 |

It is clearly noted from Table 2 that the filters of Examples 15 and 16 containing the phthalocyanine compounds of this invention efficiently absorbed and shielded the heat ray without interfering the passage of the visible ray because they repressed the rise of temperature and manifested high transmittance to the visible ray as compared with the filters of Controls 6 and 7. That is, the filters of this invention excelled in transparency and in the effect of shielding the heat ray as well. Further, the fact that the filters of this invention revealed only small color difference after the test for lightfastness, excelled in weatherability, and sufficiently tolerated practical use is shown from Table 2.

The entire disclosure of Japanese Patent Application No. 11-217,736 filed on Jul. 30, 2000 including specification, claims, drawings and summary are incorporated herein by reference in its entirety.

What is claimed is:

1. A phthalocyanine compound represented by the following formula (1):

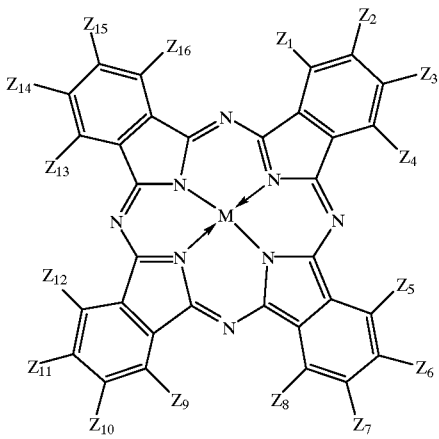

wherein $Z_2$, $Z_3$, $Z_6$, $Z_7$, $Z_{10}$, $Z_{11}$, $Z_{14}$, and $Z_{15}$ independently stand for SR$^1$, OR$^2$, or a halogen atom, provided that at least one of them stands for SR$^1$ or OR$^2$; $Z_1$, $Z_4$, $Z_5$, $Z_8$, $Z_9$, $Z_{12}$, $Z_{13}$, an $Z_{16}$ independently stand for NHR$^3$, SR$^1$, OR$^2$, or a halogen atom, provided that at least one of them stands for NHR$^3$ and at least four of them stand for OR$^2$; R$^1$, R$^2$, and R$^3$, independently to each other, stand for a substituted or non-substituted phenyl group, a substituted or non-substituted aralkyl group, or a substituted or non-substituted alkyl group of 1 to 20 carbon atoms; and M stands for a metal, a metal oxide, or a metal halide.

2. A phthalocyanine compound represented by the following formula (1):

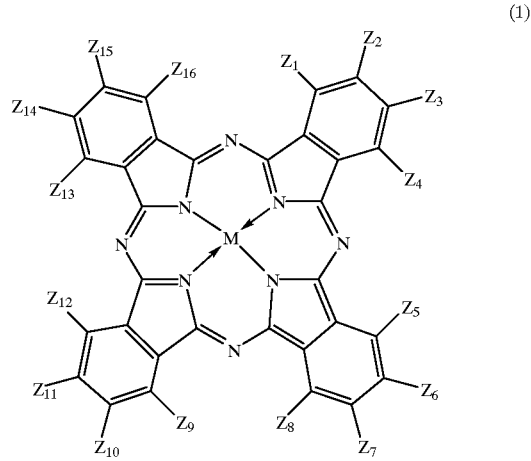

wherein $Z_2$, $Z_3$, $Z_6$, $Z_7$, $Z_{10}$, $Z_{11}$, $Z_{14}$, and $Z_{15}$ independently stand for SR$^1$, OR$^2$, or a fluorine atom, provided that at least one of them stands for SR$^1$ or OR$^2$; $Z_1$, $Z_4$, $Z_5$, $Z_8$, $Z_9$, $Z_{12}$, $Z_{13}$, and $Z_{16}$ independently stand for NHR$^3$, SR$^1$, OR$^2$, or a fluorine atom, provided that at least one of them stands for NHR$^3$ and at least four of them stand for OR$^2$, and at least one of $Z_1$ to $Z_{16}$ is a fluorine atom; R$^1$, R$^2$, and R$^3$, independently to each other, stand for a substituted or non-substituted phenyl group, a substituted or non-substituted aralkyl group, or a substituted or non-substituted alkyl group of 1 to 20 carbon atoms; and M stands for a metal, a metal oxide, or a metal halide.

3. A phthalocyanine compound according to claim 1, wherein at least four of the substituents, $Z_2$, $Z_3$, $Z_6$, $Z_7$, $Z_{10}$, $Z_{11}$, $Z_{14}$, and $Z_{15}$ in said formula (1) stand for SR$^1$ or OR$^2$.

4. A phthalocyanine compound according to claim 2, wherein at least four of the substituents, $Z_2$, $Z_3$, $Z_6$, $Z_7$, $Z_{10}$, $Z_{11}$, $Z_{14}$, and $Z_{15}$ in said formula (1) stand for SR$^1$ or OR$^2$.

5. A phthalocyanine compound according to claim 3, wherein all the substituents, $Z_2$, $Z_3$, $Z_6$, $Z_7$, $Z_{10}$, $Z_{11}$, $Z_{14}$, and $Z_{15}$ in said formula (1) stand for SR$^1$ or OR$^2$.

6. A phthalocyanine compound according to claim 4, wherein all the substituents, $Z_2$, $Z_3$, $Z_6$, $Z_7$, $Z_{10}$, $Z_{11}$, $Z_{14}$, and $Z_{15}$ in said formula (1) stand for SR$^1$ or OR$^2$.

7. A method for the production of a phthalocyanine compound of formula (1), which method comprises reacting by cyclization a phthalonitrile compound (1) represented by the following formula (2):

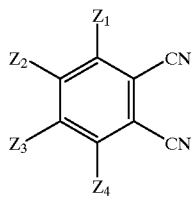

(2)

a phthalonitrile compound (2) represented by the following formula (3):

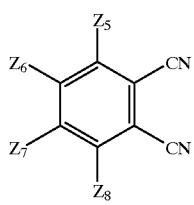

(3)

a phthalonitrile compound (3) represented by the following formula (4):

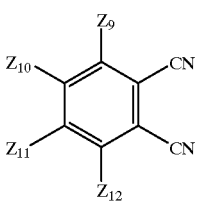

(4)

and a phthalonitrile compound (4) represented by the following formula (5):

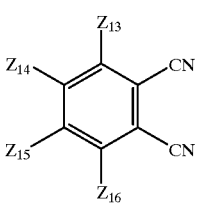

(5)

wherein in the formulae (2) to (5), $Z_2$, $Z_3$, $Z_6$, $Z_7$, $Z_{10}$, $Z_{11}$, $Z_{14}$, and $Z_{15}$ independently stand for $SR^1$, $OR^2$, or a halogen atom, provided that at least one of them stands for $SR^1$ or $OR^2$; $Z_1$, $Z_4$, $Z_5$, $Z_8$, $Z_9$, $Z_{12}$, $Z_{13}$, and $Z_{16}$ independently stand for $SR^1$, $OR^2$, or a halogen atom, provided that at least one of them stands for $SR^1$ or a halogen atom and at least four of them stand for $OR^2$; and $R^1$ and $R^2$, independently to each other, stand for a substituted or non-substituted phenyl group, a substituted or non-substituted aralkyl group, or a substituted or non-substituted alkyl group of 1 to 20 carbon atoms, with one member selected from the group consisting of metal oxides, metal carbonyls, metal halides and organic acid metals, and thereafter reacting the resultant reaction product with an amine compound of the formula $NH_2R^3$, wherein $R^3$ stands for a substituted or non-substituted phenyl group, a substituted or non-substituted aralkyl group, or a substituted or non-substituted alkyl group of 1 to 20 carbon atoms.

8. A method according to claim 7, wherein said phthalonitrile compound is obtained by causing a phthalonitrile derivative represented by the following formula (6):

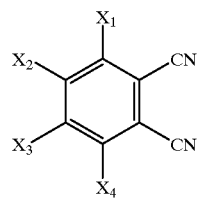

(6)

wherein $X_1$, $X_2$, $X_3$, and $X_4$ independently stand for a halogen atom, to react with $HSR^1$ and/or $HOR^2$, wherein $R^1$ and $R^2$ independently stand for a substituted or non-substituted phenyl group, a substituted or non-substituted aralkyl group, or a substituted or non-substituted alkyl group of 1 to 20 carbon atoms.

9. A phthalocyanine compound according to claim 1, wherein M is copper, zinc, cobalt, nickel, iron, vanadyl, titanyl, chloroindium, or tin(II) chloride.

10. A phthalocyanine compound according to claim 1, wherein $R^1$, $R^2$, and $R^3$, independently, stand for a phenyl group, non-substituted or substituted with alkyl, halo, or cyano; an aralkyl group of 1 to 20 carbons, non-substituted or substituted at the aryl or the alkyl group with alkyl, halo, or cyano; or an alkyl group of 1 to 20 carbon atoms, non-substituted or substituted with alkyl, halo, or cyano.

11. A phthalocyanine compound according to claim 1, wherein the compound is $VOPc(2,5-Cl_2-PhO)_8(2,6-(CH_3)_2PhO)_4(PhCH_2NH)_4$, $CuPc(2,5-Cl_2PhO)_8(2,6-(CH_3)_2PhO)_4(PhCH_2NH)_4$, or $VOPc(PhS)_8(2,6-(CH_3)_2PhO)_4\{PhCH_2NH\}_4$.

12. A phthalocyanine compound according to claim 2, wherein M is copper, zinc, cobalt, nickel, iron, vanadyl, titanyl, chloroindium, or tin(II) chloride.

13. A phthalocyanine compound according to claim 2, wherein $R^1$, $R^2$, and $R^3$, independently, stand for a phenyl group, non-substituted or substituted with alkyl, halo, or cyano; an aralkyl group of 1 to 20 carbons, non-substituted or substituted at the aryl or the alkyl group with alkyl, halo, or cyano; or an alkyl group of 1 to 20 carbon atoms, non-substituted or substituted with alkyl, halo, or cyano.

14. A phthalocyanine compound according to claim 2, wherein the compound is $VOPc(2,5-Cl_2PhO)_8(2,6-Br_2-4-CH_3PhO)_4\{Ph(CH_3)CHNH\}_3F$, $VOPc(2,5-Cl_2PhO)_8(2,6-Br_2-4-CH_3PhO)_4(PhCH_2NH)_3F$, $VOPc(2,5-Cl_2PhO)_8(2,6-(CH_3)_2PhO)_4\{Ph(CH_3)CHNH\}_3F$, $VOPc(2,6-Cl_2PhO)_8(2,6-(CH_3)_2PhO)_4\{Ph(CH_3)CHNH\}_3F$, $VOPc(4-CNPhO)_8(2,6-Br_2-4-CH_3PhO)_4\{Ph(CH_3)CHNH\}_3F$, or $VOPc(4-CNPhO)_8(2,6-(CH_3)_2PhO)_4\{Ph(CH_3)CHNH\}_3F$.

* * * * *